(12) United States Patent
Oba et al.

(10) Patent No.: US 6,832,083 B1
(45) Date of Patent: Dec. 14, 2004

(54) MULTIUSER COMMUNICATIONS DEVICE

(75) Inventors: Haruo Oba, Kanagawa (JP); Kunihito Sawai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/037,217

(22) Filed: Mar. 10, 1998

(30) Foreign Application Priority Data

Mar. 12, 1997 (JP) .......................................... PO9-076606

(51) Int. Cl.[7] .......................................... H04M 11/10
(52) U.S. Cl. .............................. 455/412.1; 455/556.1; 455/566; 455/575.1
(58) Field of Search .............................. 455/66.1, 412, 455/413, 575, 90, 572, 566, 556, 557

(56) References Cited

U.S. PATENT DOCUMENTS

| | | | | |
|---|---|---|---|---|
| 5,146,217 A | * | 9/1992 | Holmes et al. ........ 340/825.44 |
| 5,283,818 A | * | 2/1994 | Klausner et al. ............ 379/142 |
| 5,465,401 A | * | 11/1995 | Thompson ................... 445/90 |
| 5,533,097 A | * | 7/1996 | Crane et al. ................ 455/557 |
| 5,584,070 A | * | 12/1996 | Harris et al. ............... 340/7.54 |
| 5,671,267 A | * | 9/1997 | August et al. .............. 455/420 |
| 5,737,394 A | * | 4/1998 | Anderson et al. ........... 455/412 |
| 5,742,910 A | * | 4/1998 | Callant et al. .............. 455/550 |
| 5,796,394 A | * | 8/1998 | Wicks et al. ................ 345/751 |
| 5,797,089 A | * | 8/1998 | Nguyen ....................... 455/403 |
| 5,831,664 A | * | 11/1998 | Wharton et al. ............... 725/81 |
| 5,848,356 A | * | 12/1998 | Jambhekar et al. ......... 455/403 |
| 5,915,225 A | * | 6/1999 | Mills ........................... 455/558 |
| 5,920,826 A | * | 7/1999 | Metso et al. ................ 455/557 |
| 5,923,861 A | * | 7/1999 | Bertram et al. ............. 345/786 |
| 5,966,663 A | * | 10/1999 | Gleason ....................... 455/466 |
| 6,009,336 A | * | 12/1999 | Harris et al. ................. 455/566 |
| 6,115,618 A | * | 9/2000 | Lebby et al. ................ 455/566 |
| 6,119,020 A | * | 9/2000 | Miller et al. ................ 455/558 |
| 6,144,848 A | * | 11/2000 | Walsh et al. ................ 455/419 |
| 6,226,367 B1 | * | 5/2001 | Smith et al. ................. 379/142 |
| 6,243,596 B1 | * | 6/2001 | Kikinis ........................ 455/572 |
| 6,259,405 B1 | * | 7/2001 | Stewart et al. .............. 342/457 |
| 6,289,213 B1 | * | 9/2001 | Flint et al. ................... 455/420 |
| 6,330,244 B1 | * | 12/2001 | Swartz et al. ............... 370/401 |
| 6,370,389 B1 | * | 4/2002 | Isomursu et al. ........... 455/414 |
| 6,535,243 B1 | * | 3/2003 | Tullis ....................... 348/207.1 |

* cited by examiner

Primary Examiner—Tilahun Gesesse
(74) Attorney, Agent, or Firm—Sonnenschein, Nath & Rosenthal LLP

(57) ABSTRACT

The invention is intended to allow a plurality of users to share a single apparatus while securing the privacy of each user. A terminal is made portable and detachable from a base. Data exchange by radio is made possible between the base and the terminal, and E-mail or facsimile data that is received by the base through a telephone circuit is stored in the terminal. A user can remove the terminal from the base and carry it to his room, and can display a stored E-mail message or facsimile data there.

6 Claims, 37 Drawing Sheets

FIG.38
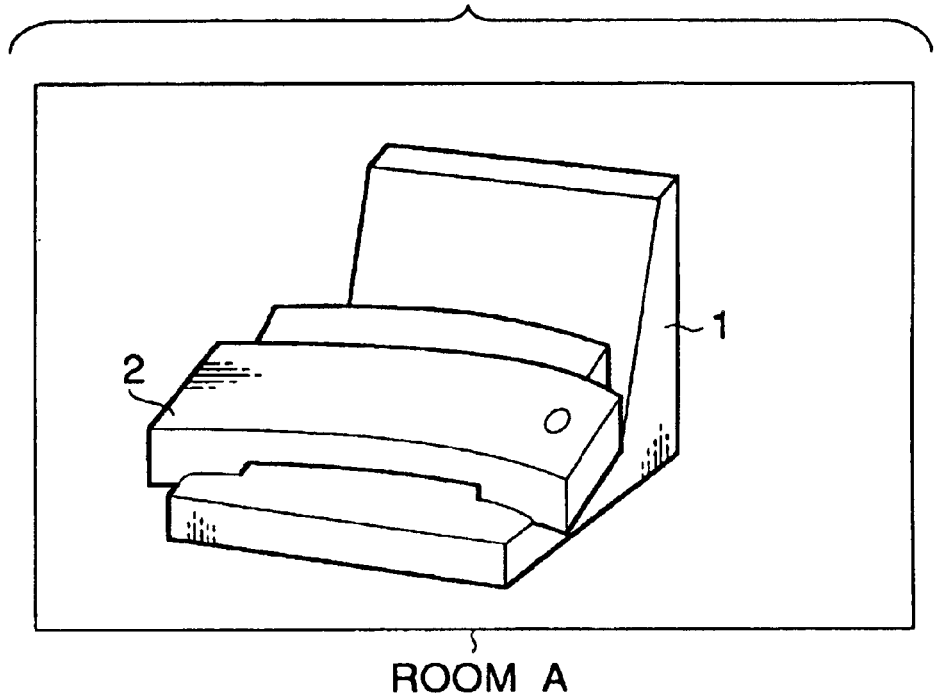
ROOM A
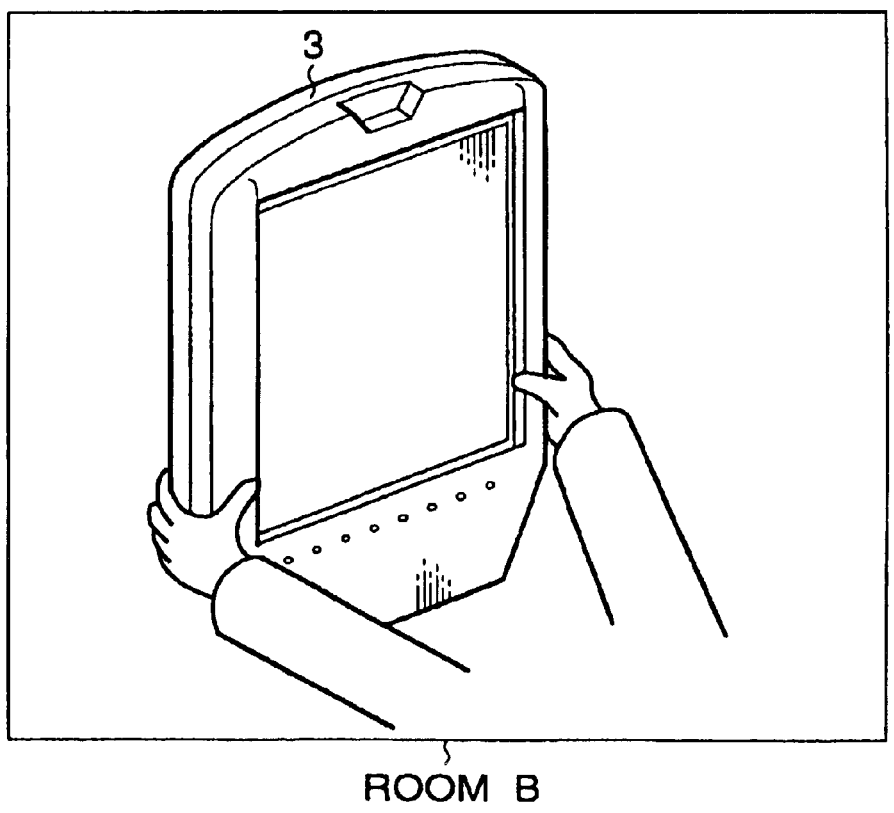
ROOM B

MULTIUSER COMMUNICATIONS DEVICE

BACKGROUND OF THE INVENTION

1. Field of the Invention

The present invention relates to an information processing apparatus and method and a display control apparatus and method. In particular, the invention relates to an information processing apparatus and method and a display control apparatus and method which enable a single apparatus to be shared by, for instance, a plurality of family members in a home while a certain level of privacy is secured.

2. Description of the Related Art

Networks as typified by the Internet have spread in recent years and transmission of a message to a desired person is now commonly done by E-mail or facsimile in not only places of work but also homes.

Conventionally, in each home, a received facsimile message or E-mail is displayed on a television receiver or a display device of a personal computer.

However, where E-mail or a facsimile message is displayed on, for instance, a television receiver, there is a problem that other family members may be informed of a message that one family member does not want them to know; that is, his privacy is not secured.

Where a message received by E-mail or facsimile is displayed on a television receiver, screen switching, screen division, or like processing is needed to display the icon of an urgent facsimile message or E-mail or view its contents on the television screen. This causes a problem that a user cannot fully enjoy television programs during such processing.

SUMMARY OF THE INVENTION

An object of the present invention is to prevent such an event that a user cannot fully enjoy television programs and to secure the privacy of each family member.

The information processing apparatus according to the first aspect of the present invention comprises a first member and a second member. The first member comprises communicating means for communicating with a telephone network; supplying means for supplying power to the second member; and first exchanging means for exchanging data wirelessly with the second member. The second member comprises second exchanging means for exchanging data wirelessly with the first member; processing means for processing data that is supplied from the first member; display means for performing a prescribed display; and input means for allowing a prescribed input.

The information processing method according to the first aspect of the present invention comprises, in the first member, a communicating step of communicating with a telephone network; a supplying step of supplying power to a second member; and a first exchanging step of exchanging data wirelessly with the second member. The information processing method further comprises, in the second member, a second exchanging step of exchanging data wirelessly with the first member; a processing step of processing data that is supplied from the first member; a display step of performing a prescribed display; and an input step of allowing a prescribed input.

In the information processing apparatus and the information processing method according to the first aspect of the present invention, data is exchanged wirelessly between the first member and the second member. Information is displayed on the second member that is portable and detachable from the first member.

The information processing apparatus according to the second aspect of the present invention comprises storing means for storing information that is received through a telephone network; selection means constituted of symbols displayed on a display device, and selected by a plurality of users, respectively, to identify themselves in reading out a desired one from among pieces of information directed to the users that are stored in the storing means; and output means for reading out, when one symbol of the selection means is selected, a piece of information corresponding to the selected symbol from among the pieces of information stored in the storing mean, and for outputting the read-out piece of information.

In the above information processing apparatus, a plurality of symbols are provided to allow a plurality of users to identify themselves. When one of the plurality of symbols is selected, a piece of information corresponding to the selected symbol is read out from the pieces of information stored in the storage device.

The information processing method according to the second aspect of the present invention comprises a storing step of storing information that is received through a telephone network; a preparing step of preparing a plurality of symbols corresponding to a plurality of users, respectively, so that a selection can be made from among the symbols for the users to identify themselves in reading out a desired one from among pieces of information directed to the users that are stored in the storing step; and an output step of reading out, when one symbol is selected, a piece of information corresponding to the selected symbol from among the pieces of information stored in the storing step, and outputting the read-out piece of information.

In the above information processing method, a plurality of symbols corresponding to a plurality of users, respectively, are prepared. When one of the plurality of symbols is selected, a piece of information corresponding to the selected symbol is read out from the pieces of information stored.

The information processing apparatus according to the third aspect of the present invention comprises storing means for storing E-mail addresses and telephone numbers of a plurality of persons to be accessed through a telephone network; manipulation means to be manipulated in accessing a desired person through the telephone network; first display means for displaying, when an instruction to access a certain person by E-mail is made, a correlation table of the E-mail addresses and the telephone numbers of the respective persons and information necessary to transmit E-mail at the same time; second display means for displaying, when an instruction to access a certain person by telephone, a correlation table corresponding to that displayed by the first display means and information necessary for access by telephone at the same time; and accessing means for accessing, when one person is selected from the correlation table, the selected person through the telephone network.

The information processing method according to the third aspect of the present invention comprises a storing step of storing E-mail addresses and telephone numbers of a plurality of persons to be accessed through a telephone network; a manipulation step in which a manipulation is made in accessing a desired person through the telephone network; a first display step of displaying, when an instruction to access a certain person by E-mail is made, a correlation table of the E-mail addresses and the telephone numbers of the respective persons and information necessary to transmit E-mail at the same time; a second display step of displaying, when an instruction to access a certain person by telephone, a correlation table corresponding to that displayed by the first display means and information necessary for access by telephone at the same time; and an accessing step of accessing, when one person is selected from the correlation table, the selected person through the telephone network.

In the information processing apparatus and the information processing method according to the third aspect of the present invention, a correlation table of E-mail addresses and telephone numbers of respective persons is displayed in each of a case of accessing a certain person by E-mail and a case of accessing a certain person by telephone.

The display control apparatus according to the present invention comprises first display means for displaying first information necessary to access a certain person who is determined by an E-mail address; second display means for displaying second information necessary to access a certain person who is determined by a telephone number; first manipulation means to be displayed together with the first information and to be manipulated in making a transition from a state that the first information is displayed to a state that the second information is displayed; and second manipulation means to be displayed together with the second information and to be manipulated in making a transition from the state that the second information is displayed to the state that the first information is displayed.

The display control method according to the present invention comprises a first step of displaying first information necessary to access a certain person who is determined by an E-mail address; a second step of displaying second information necessary to access a certain person who is determined by a telephone number; a third step of displaying, together with the first information, a first manipulation portion to be manipulated in making a transition from a state that the first information is displayed to a state that the second information is displayed; and a fourth step of displaying, together with the second information, a second manipulation portion to be manipulated in making a transition from the state that the second information is displayed to the state that the first information is displayed.

In the display control apparatus and the display control method according to the present invention, the manipulation portion to be manipulated in making a transition to the other state is displayed in each of a state that first information necessary to access a certain person by using his E-mail address is displayed and a state that second information necessary to access a certain person by using his telephone number is displayed.

As described above, in the information processing apparatus and the information processing method according to the first aspect of the present invention, data is exchanged wirelessly between the first and second members, information is displayed and a prescribed input is allowed in the second member, and the second member is portable. Therefore, it becomes possible for a plurality of users to immediately check received information while the privacy of each user is secured. There no longer occurs an event that the use of other AV devices such as a television receiver is obstructed.

In the information processing apparatus according to the second aspect of the present invention, a plurality of symbols are allocated to a plurality of users, respectively. When one of the plurality of symbols is selected, a piece of information corresponding to the selected symbol is read out from the pieces of information stored in the storage device and is then output. Therefore, it becomes possible for the plurality of users to check received information while the privacy of each user is secured.

In the information processing method according to the second aspect of the present invention, a plurality of symbols corresponding to a plurality of users, respectively, are prepared. When one of the plurality of symbols is selected, a piece of information corresponding to the selected symbol is read out from the pieces of information stored and is then output. Therefore, it becomes possible for the plurality of users to check received information while the privacy of each user is secured.

In the information processing apparatus and the information processing method according to the third aspect of the present invention, a correlation table of E-mail addresses and telephone numbers is commonly used in a case of accessing a certain person by E-mail and a case of accessing a certain person by telephone. Therefore, a process of exchanging data by E-mail and a process of exchanging data by facsimile can be executed substantially without discriminating those processes from each other, i.e., regarding those processes as substantially the same kind of process.

In the display control apparatus and the display control method according to the present invention, a manipulation for making a transition to the other state is possible in each of a state that first information is displayed and a state that second information is displayed. Therefore, switching between access by telephone and access by E-mail can be made quickly. For example, when absence of a person to communicate with is found by calling him, switching to access by E-mail can be made immediately. The ease of operation is thus improved.

BRIEF DESCRIPTION OF THE DRAWINGS

FIG. 38 shows how the information processing apparatus of FIG. 1 is used.

DETAILED DESCRIPTION OF THE PREFERRED EMBODIMENT

Before description of an embodiment of the present invention, to clarify a correlation between the means of the invention described in the claims and the components of the embodiment, the features of the invention will be described below in such a manner that the respective means are followed, in parentheses, by the corresponding components (just examples) of the embodiment. Naturally this description does not mean that the respective means are limited to the associated components.

Figure 1:
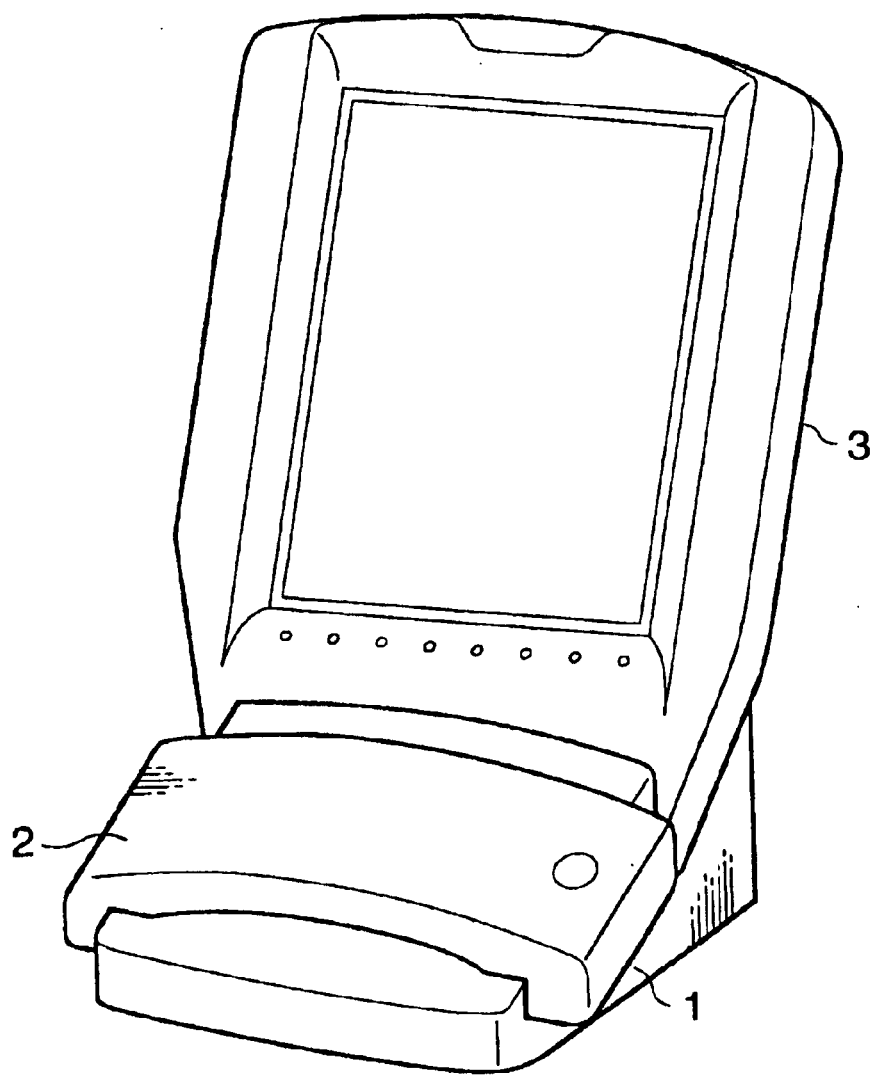
FIG. 1 is a perspective view showing an example of configuration of an information processing apparatus according to the present invention.
Figure 2:
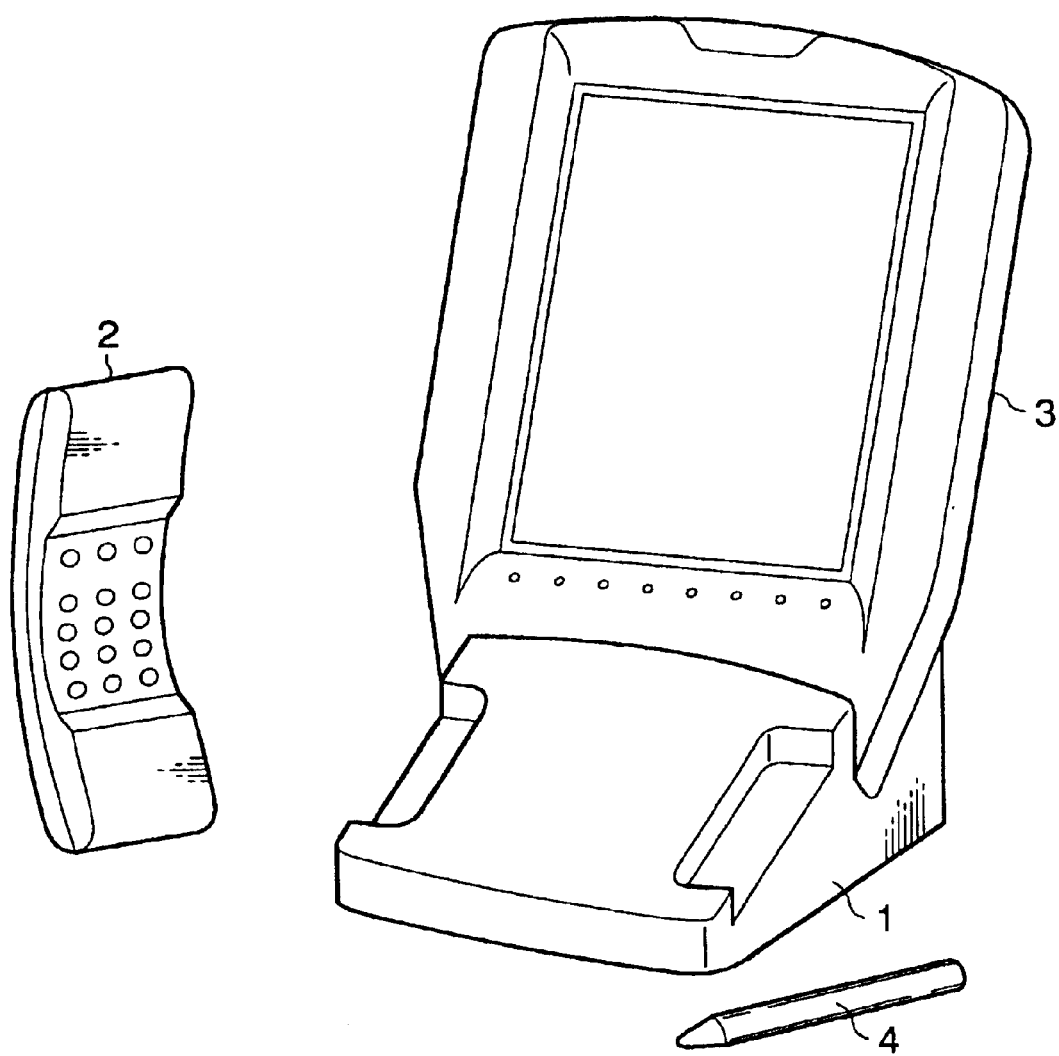
FIG. 2 is a perspective view of the information processing apparatus in a state that a telephone 2 and a pen 4 are detached therefrom.

The information processing apparatus according to the first aspect of the present invention comprises a first member (for instance, a base 1 shown in FIG. 1) and a second member (for instance, a terminal 3 shown in FIG. 1). The first means comprises communicating means (for instance, a modem 47 shown in FIG. 15) for communicating with a telephone network; supplying means (for instance, a charger 42 shown in FIG. 15) for supplying power to the second member; and first exchanging means (for instance, an RF transmission/reception section 46 shown in FIG. 15) for exchanging data wirelessly with the second member. The second member comprises second exchanging means (for instance, an RF transmission/reception section 65 shown in FIG. 15) for exchanging data wirelessly with the first member; processing means (for instance, a CPU 61 shown in FIG. 15) for processing data that is supplied from the first member; display means (for instance, an LCD 11 shown in FIG. 15) for performing a prescribed display; and input means (for instance, a touch panel 16 shown in FIG. 15) for allowing a prescribed input.

The information processing apparatus according to the second aspect of the present invention comprises storing means (for instance, a storage device 64 shown in FIG. 15) for storing information that is received through a telephone network; selection means (for instance, symbols 103 shown in FIG. 18) constituted of symbols displayed on a display device, and selected by a plurality of users, respectively, to identify themselves in reading out a desired one from among pieces of information directed to the users that are stored in the storing means; and output means (for instance, a CPU 61 shown in FIG. 15) for reading out, when one symbol of the selection means is selected, a piece of information corresponding to the selected symbol from among the pieces of information stored in the storing means, and for outputting the read-out piece of information.

The information processing apparatus according to the present invention further comprises discriminating means (for instance, marks 102 shown in FIG. 18) for indicating, when information directed to a user has been stored in the storing means, that information directed to the user is stored in the storing means.

The information processing apparatus according to the third aspect of the present invention comprises storing means (for instance, a storage means 64 shown in FIG. 15) for storing E-mail addresses and telephone numbers of a plurality of persons to be accessed through a telephone network; manipulation means (for instance, a MAIL/TEL tab 131 shown in FIG. 23) to be manipulated in accessing a desired person through the telephone network; first display means (for instance, step S16 shown in FIG. 17) for displaying, when an instruction to access a certain person by E-mail is made, a correlation table of the E-mail addresses and the telephone numbers of the respective persons and information necessary to transmit E-mail at the same time; second display means (for instance, step S16 shown in FIG. 17) for displaying, when an instruction to access a certain person by telephone, a correlation table corresponding to that displayed by the first display means and information necessary for access by telephone at the same time; and accessing means (for instance, a modem 47 shown in FIG. 15) for accessing, when one person is selected from the correlation table, the selected person through the telephone network.

Figure 25:
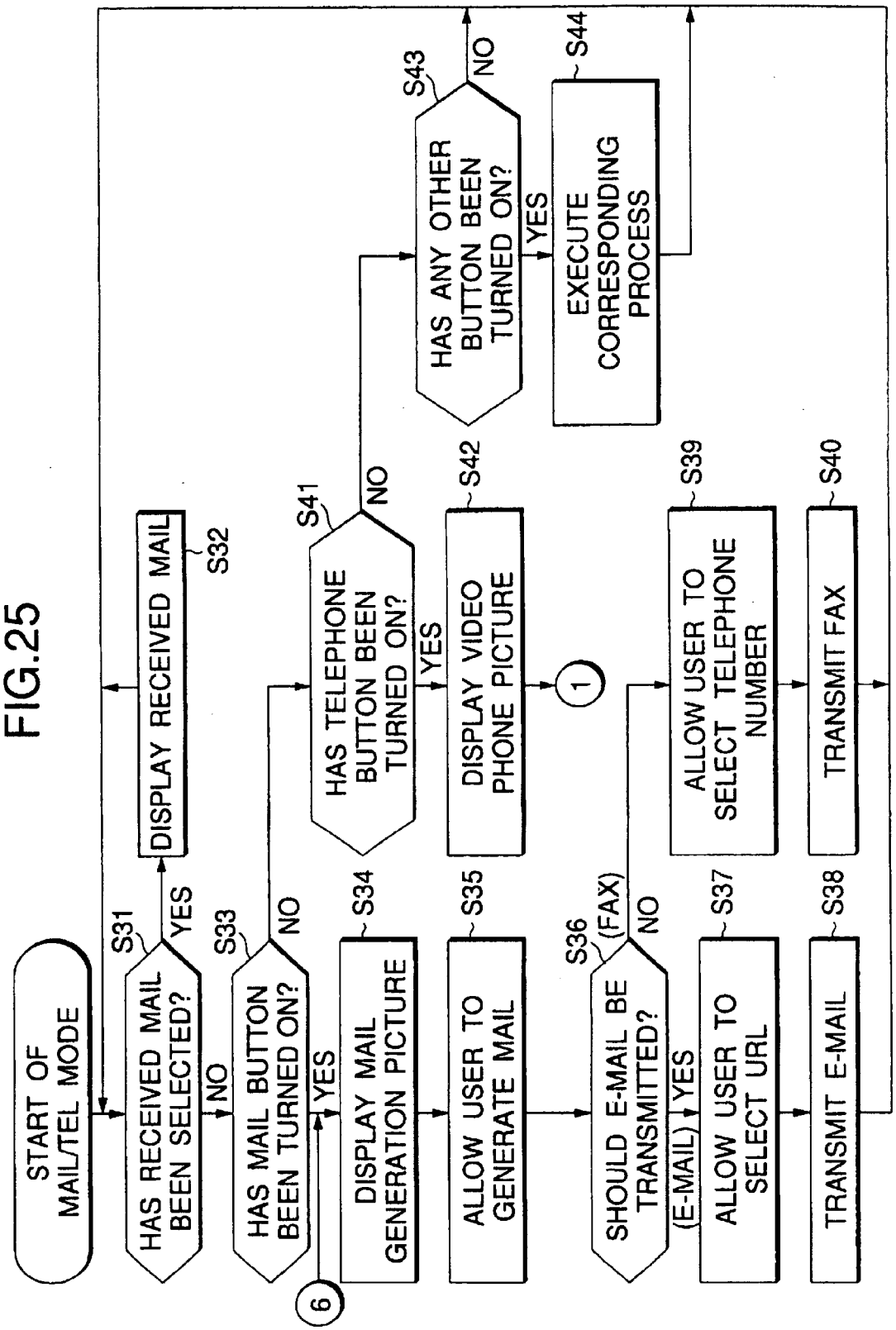
FIGS. 25–28 are a flowchart showing an operation of the terminal 3 in a MAIL/TEL mode.
Figure 26:
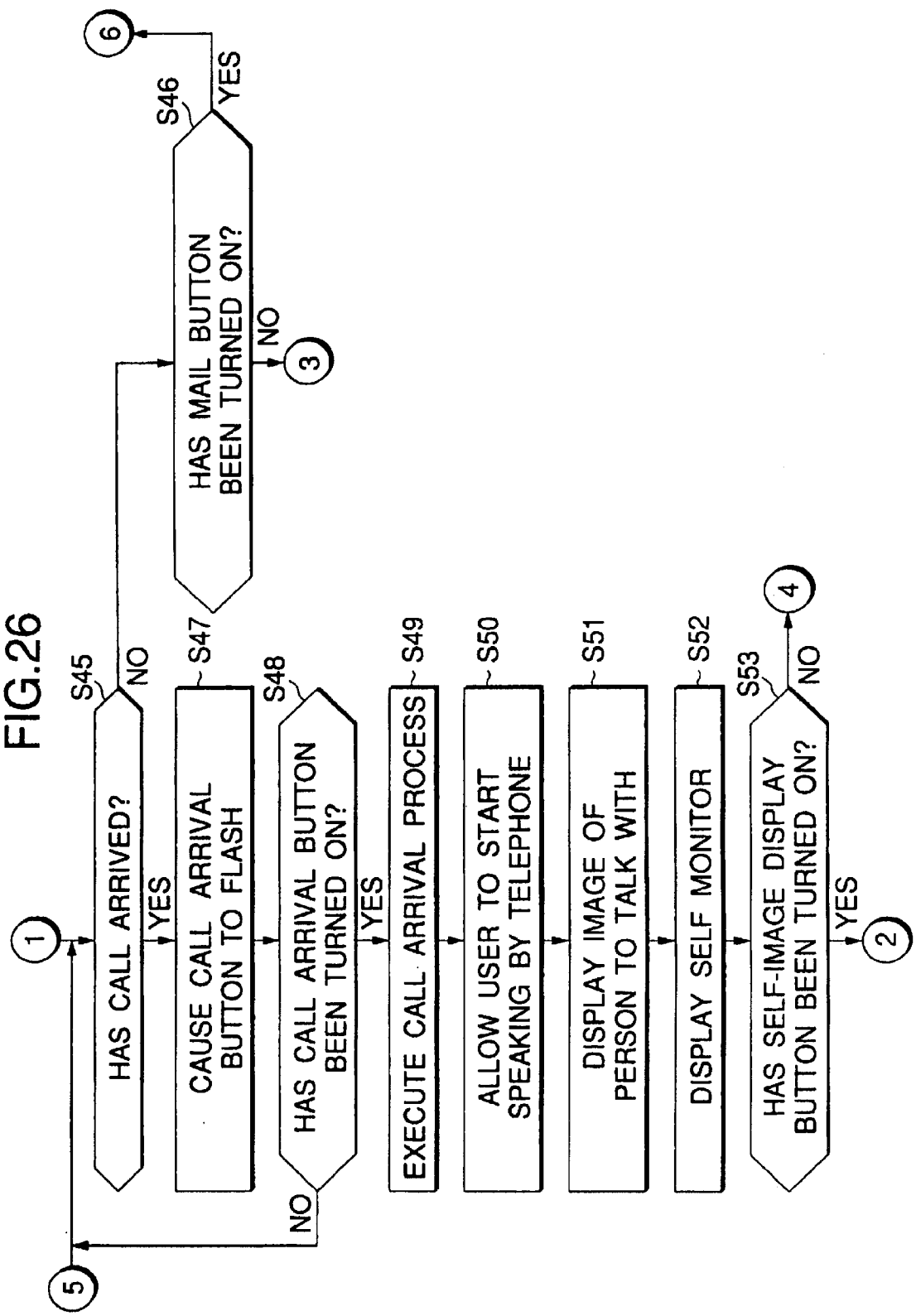
Figure 27:
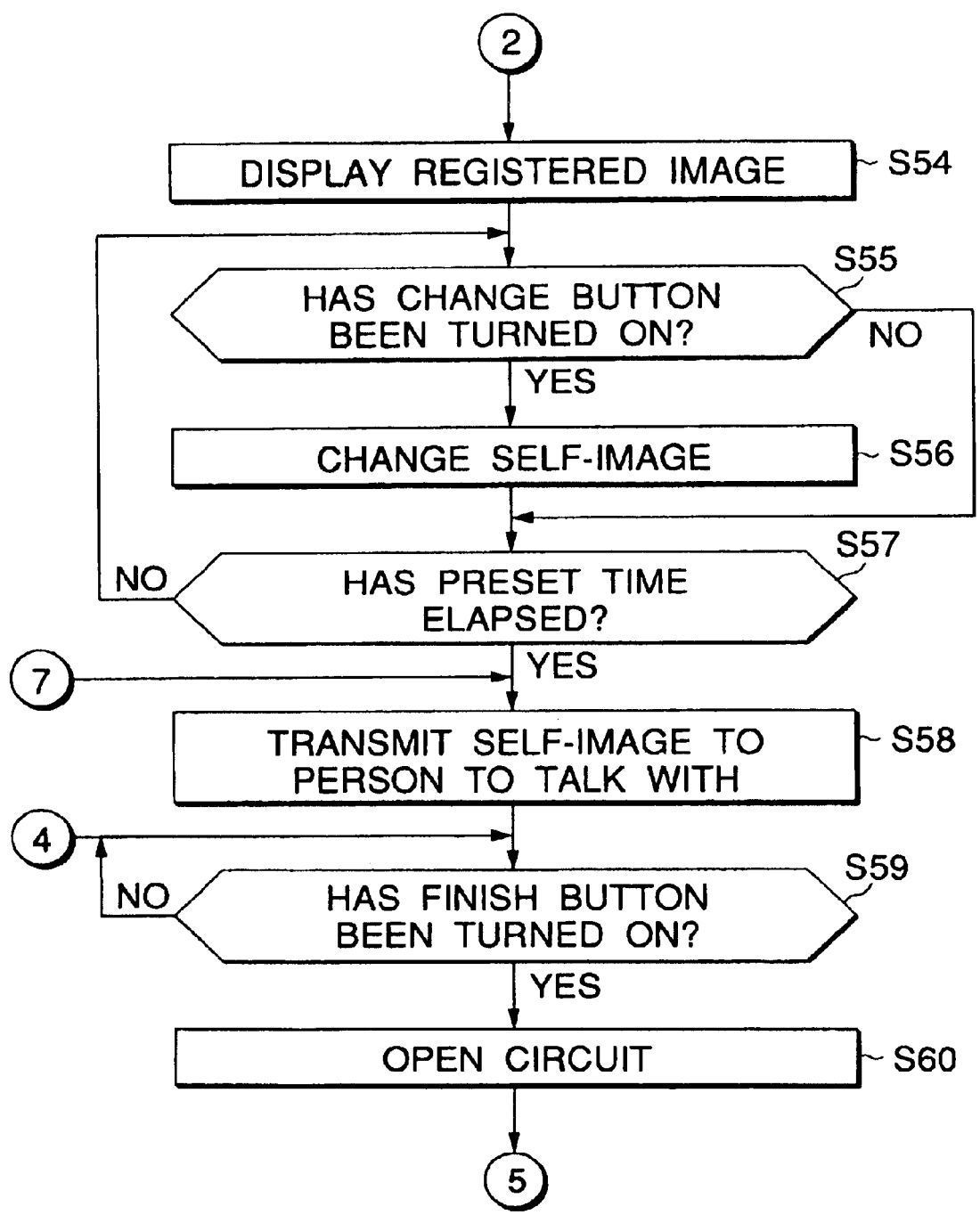
Figure 28:
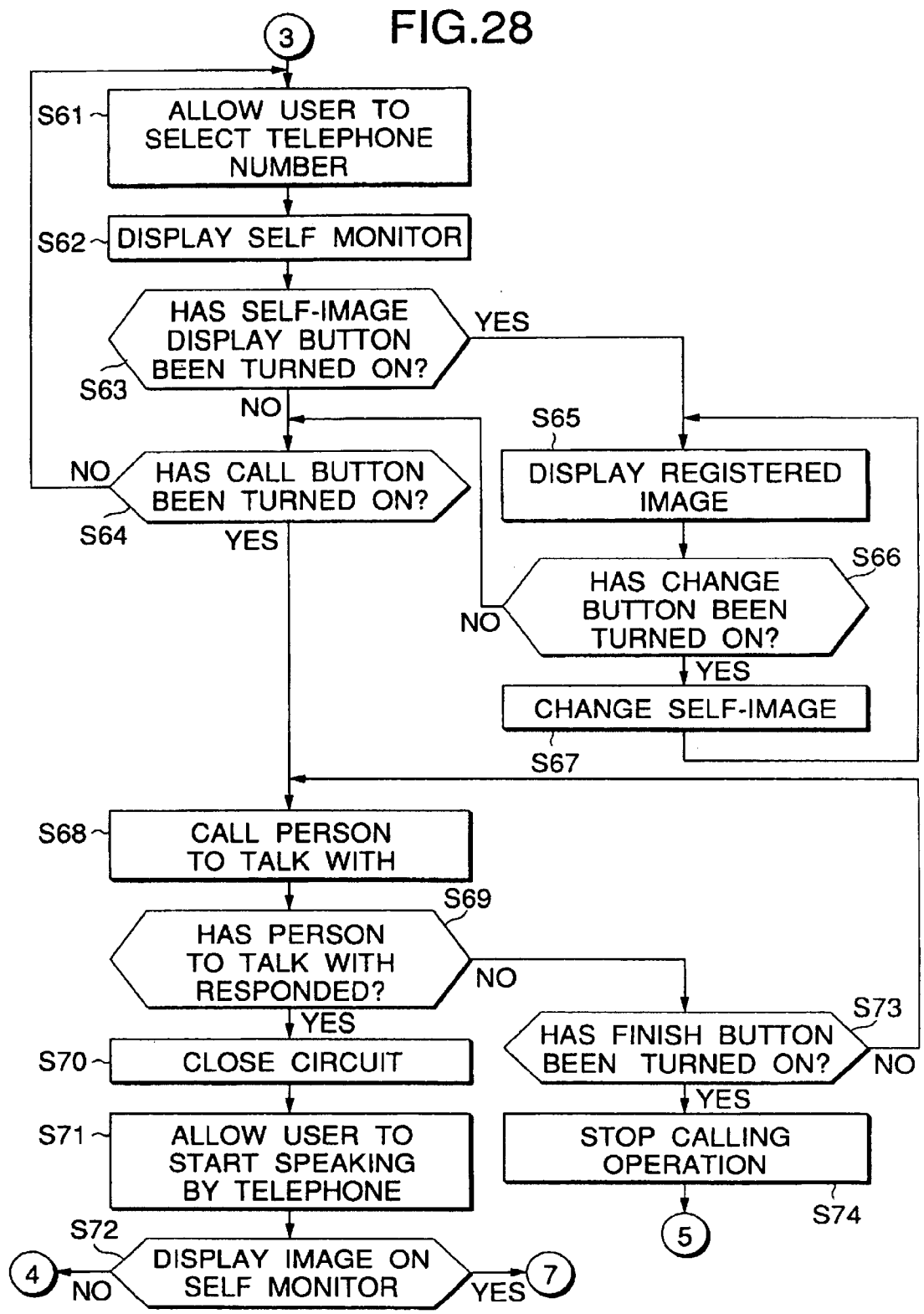

The display control apparatus according to the present invention comprises first display means (for instance, step S34 shown in FIG. 25) for displaying first information necessary to access a certain person who is determined by an E-mail address; second display means (for instance, step S42 shown in FIG. 25) for displaying second information necessary to access a certain person who is determined by a telephone number; first manipulation means (for instance, a button 141A shown in FIG. 29) to be displayed together with the first information and to be manipulated in making a transition from a state that the first information is displayed to a state that the second information is displayed; and second manipulation means (for instance, a button 141B shown in FIG. 30) to be displayed together with the second information and to be manipulated in making a transition from the state that the second information is displayed to the state that the first information is displayed.

FIGS. 1–14 show an example of configuration of an information processing apparatus according to the invention. As shown in these figures, the information processing apparatus is basically composed of a base 1, a cordless telephone 2 that is detachably mounted on the base 1, and a terminal 3. The base 1 is placed on a desk, a table, or the like. The terminal 3 is a portable one that can easily be carried by hand when detached from the base 1.

Figure 3:
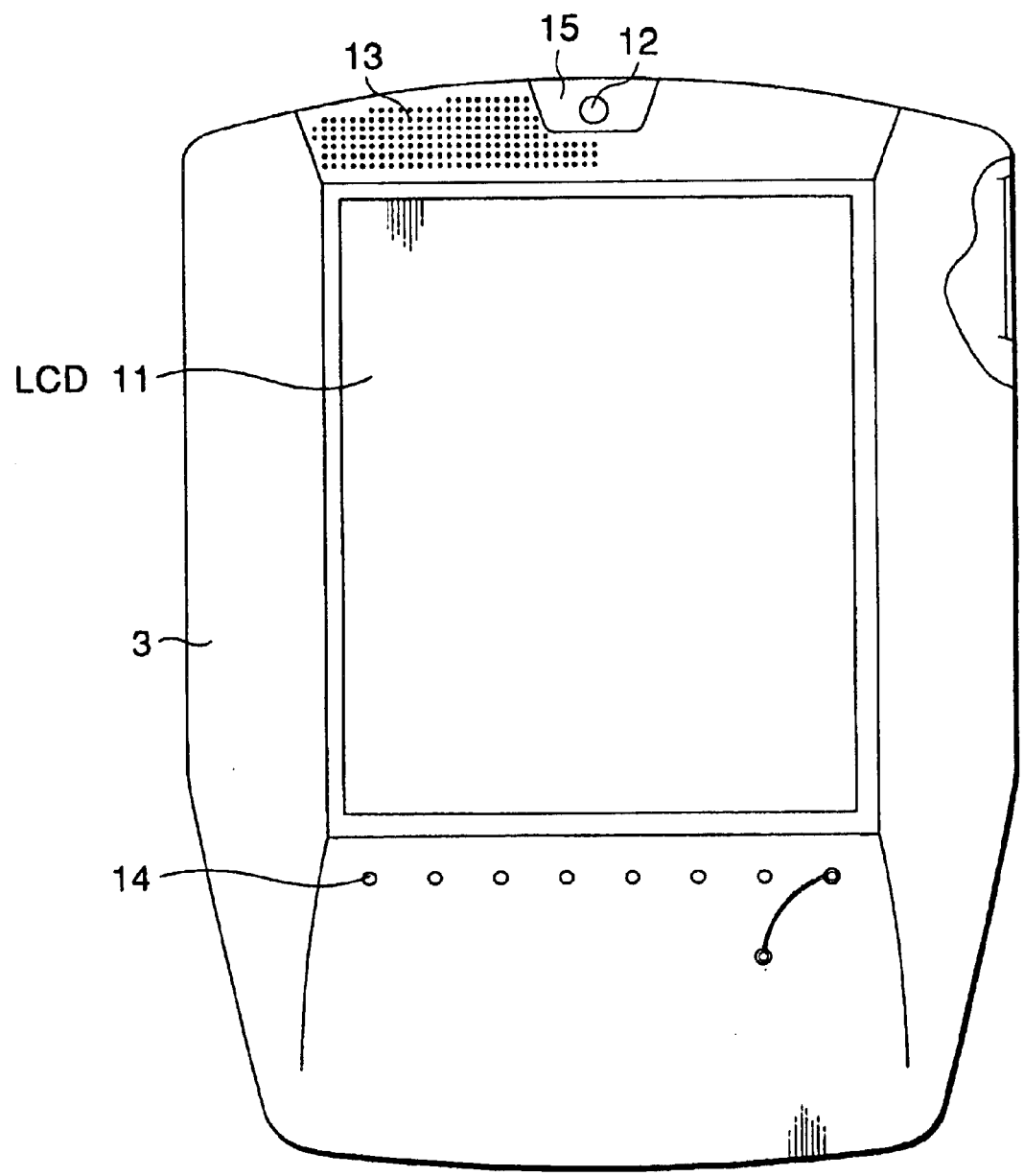
FIG. 3 is a front view showing a front-side structure of a terminal 3 shown in FIG. 1.
Figure 4:
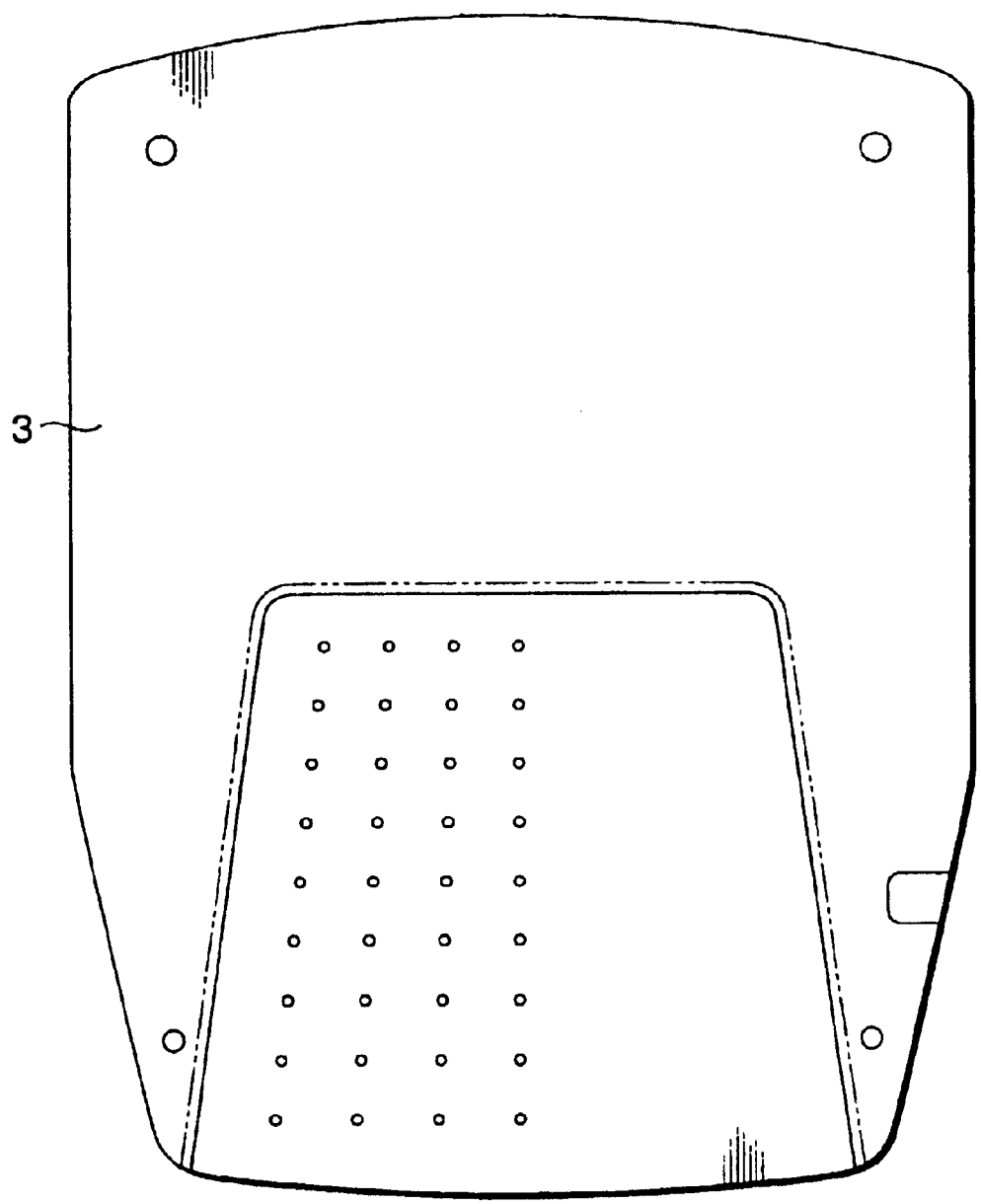
FIG. 4 is a back view showing a back-side structure of the terminal 3.

As shown in FIG. 3, an LCD 11 having a touch panel 16 on its front surface is provided at the front side of the terminal 3. Being transparent, the touch panel 16 allows a user to see a displayed image of the LCD 11 that is provided at the back side of the touch panel 16. Provided above the LCD 11, a video camera 12 can photograph a user who is viewing the LCD 11. A microphone 15, which is provided in the vicinity of the video camera 12, can pick up voice of the user in this state. A speaker 13 is provided outside the LCD 11 so as to allow the user who is viewing the LCD 11 to easily hear sound that is output from the speaker 13. A plurality of buttons 14 to be manipulated to input basic instructions to the terminal 3 are provided under the LCD 11.

Figure 5:
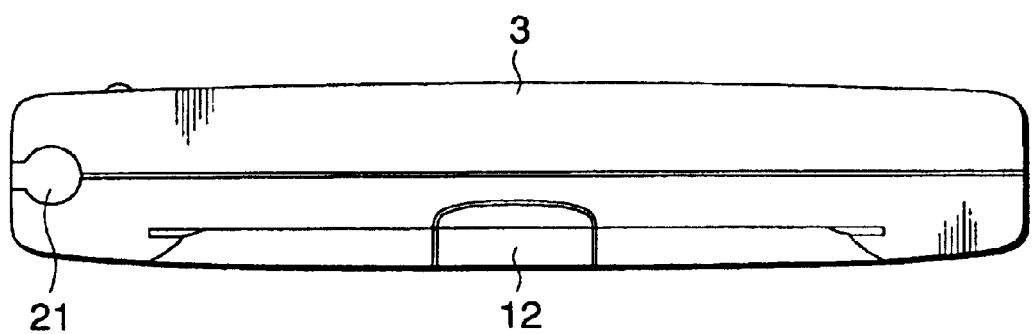
FIG. 5 is a plan view showing a top-side structure of the terminal 3.
Figure 6:
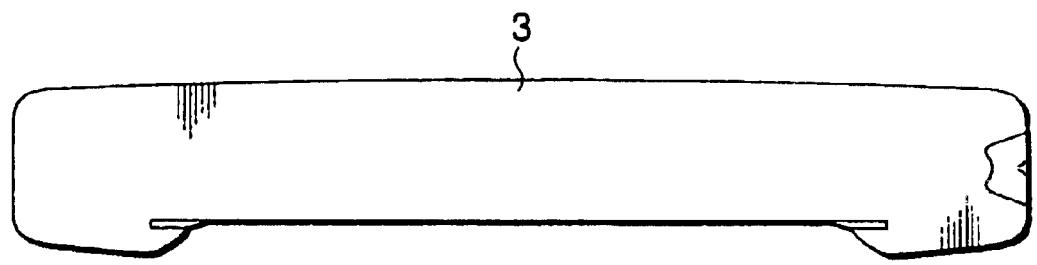
FIG. 6 is a bottom view showing a bottom-side structure of the terminal 3.
Figure 7:
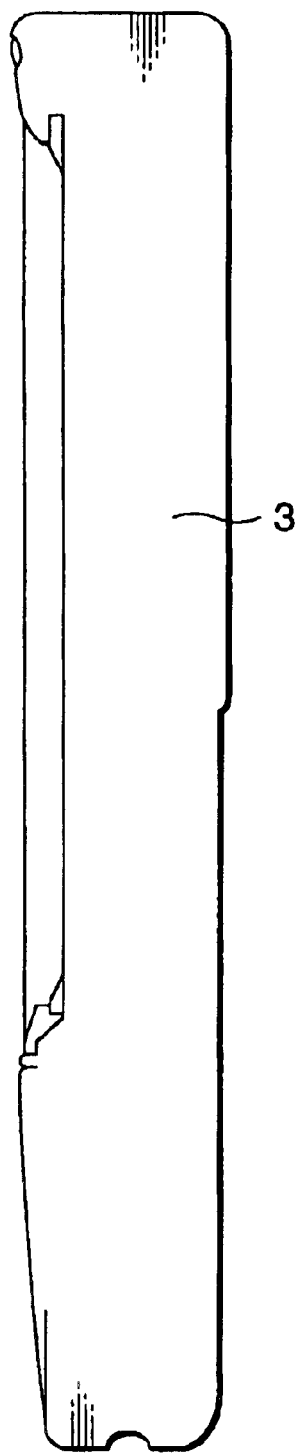
FIG. 7 is a right-hand side view showing a side structure of the terminal 3.

As shown in FIG. 5, the top surface of the terminal 3 has, at its left position, an insertion hole 21 where a pen 4 is to be inserted. When the user does not use the pen 4, he inserts it into the insertion hole 21. When the user uses the pen 4, he can pick it up from the insertion hole 21 and make a desired input to the touch panel 16.

Figure 8:
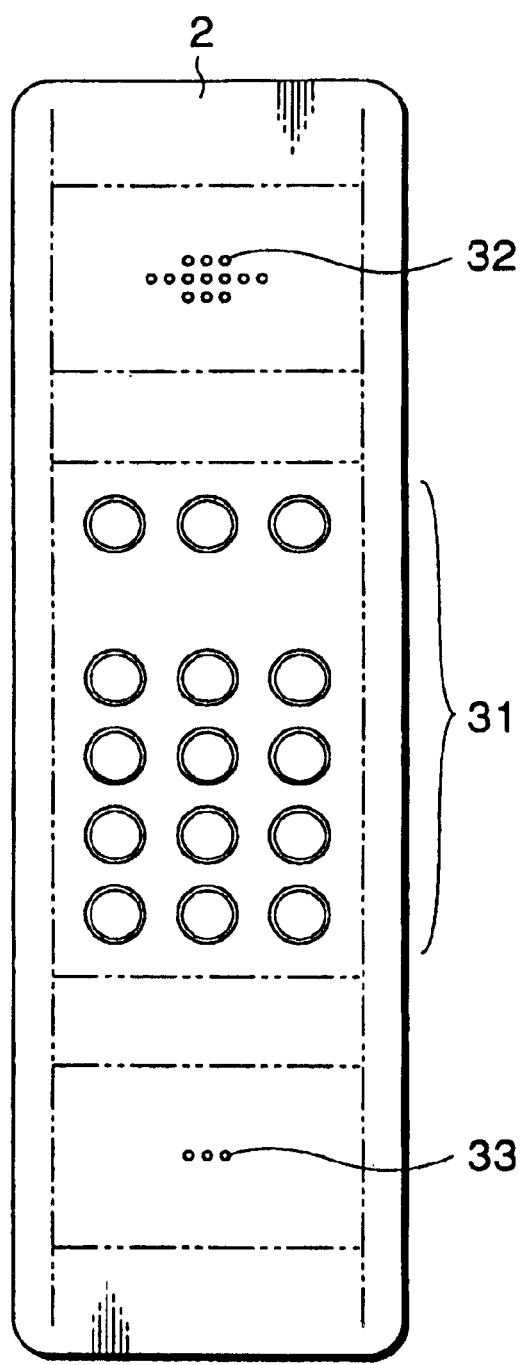
FIG. 8 is a front view showing a front-side structure of the telephone 2.
Figure 9:
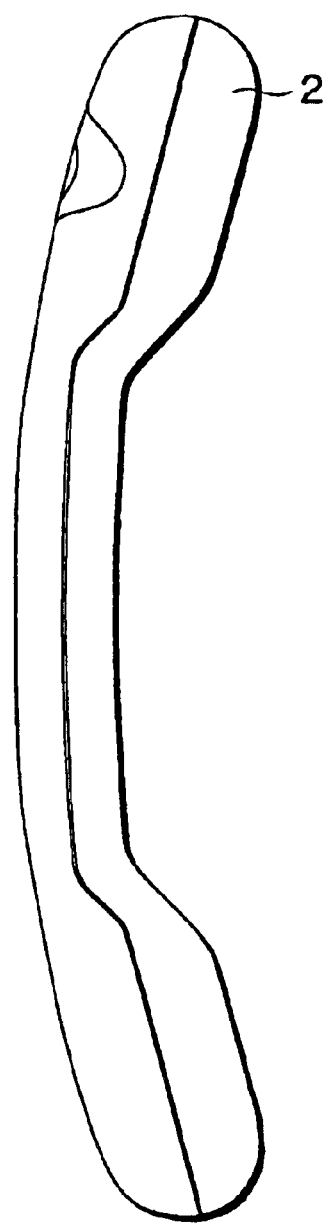
FIG. 9 is a left-hand side view showing a side structure of the telephone 2.
Figure 10:
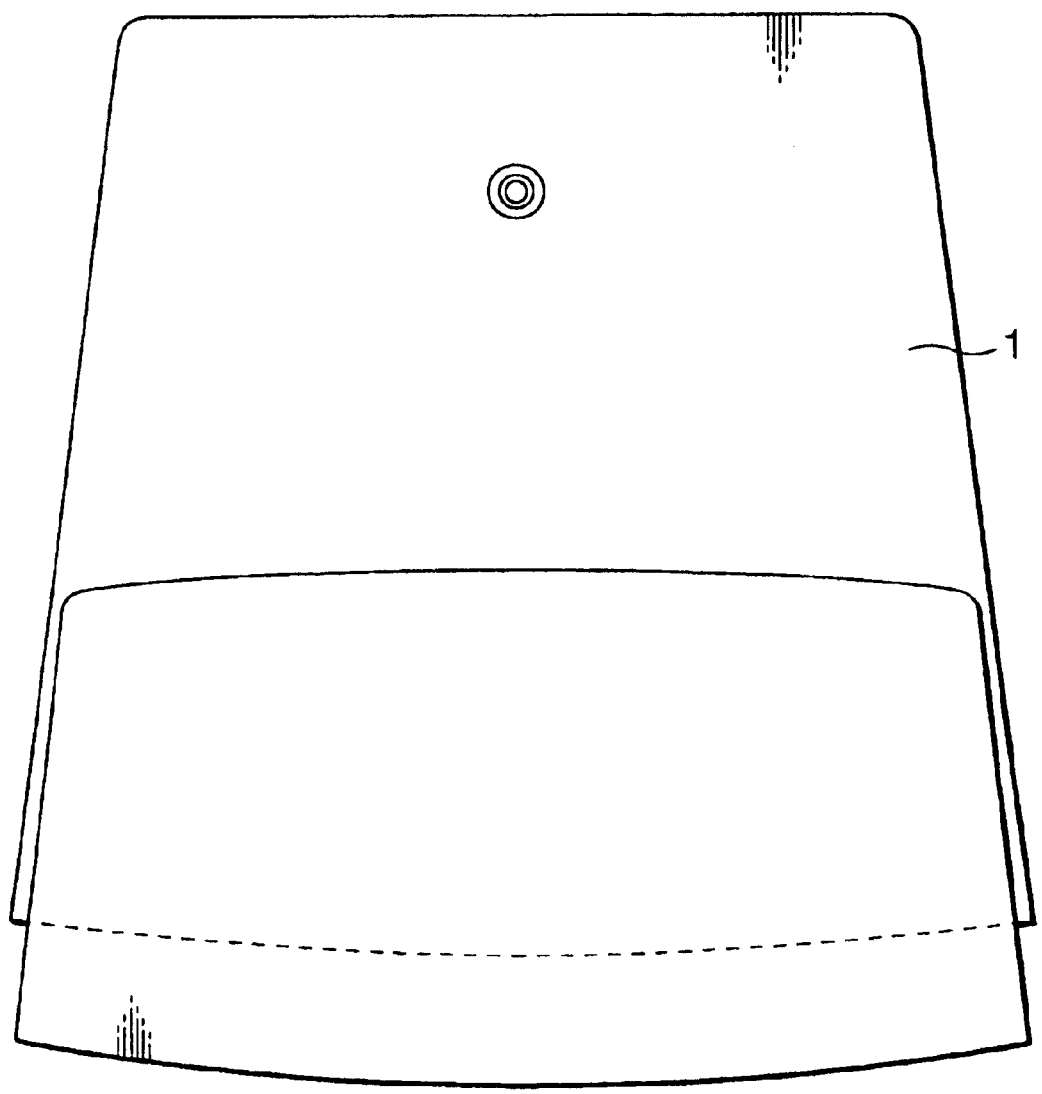
FIG. 10 is a front view showing a front-side structure of a base 1 shown in FIG. 1.
Figure 11:
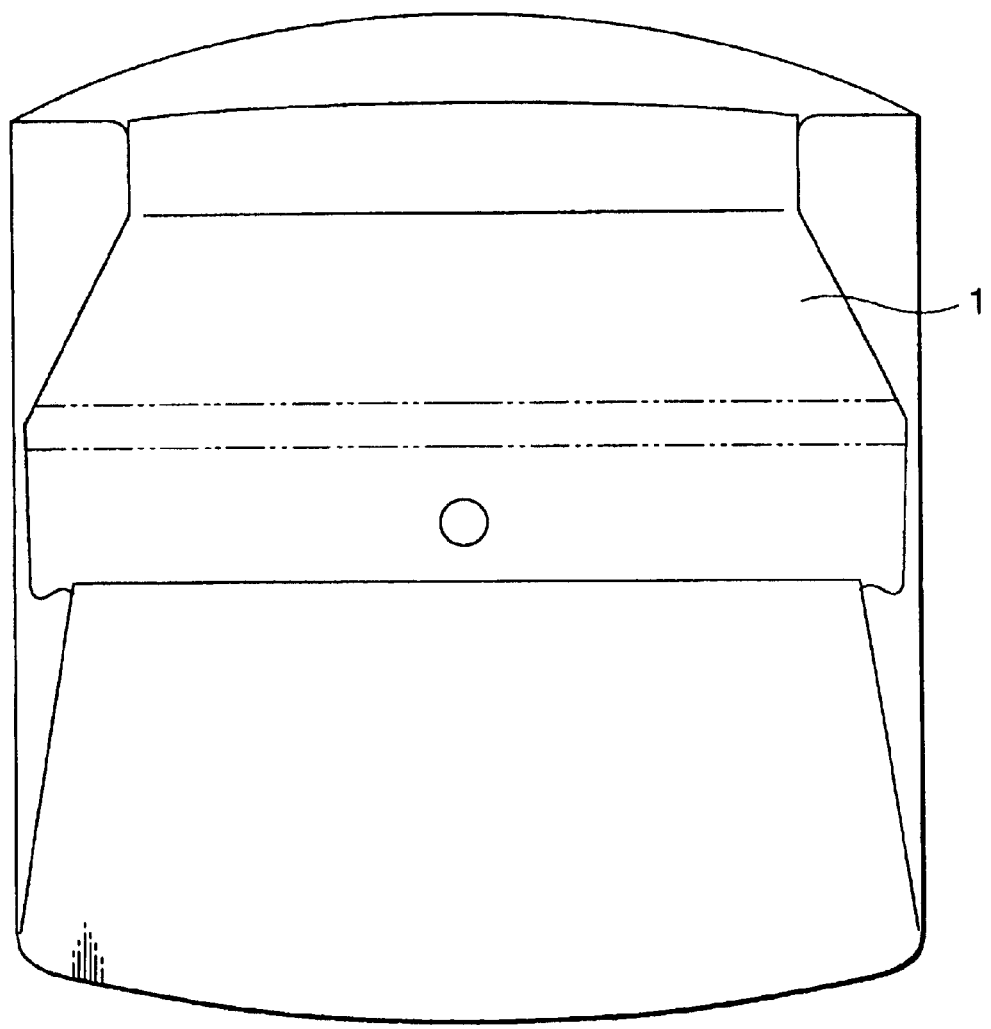
FIG. 11 is a plan view showing a top-side structure of the base 1.
Figure 12:
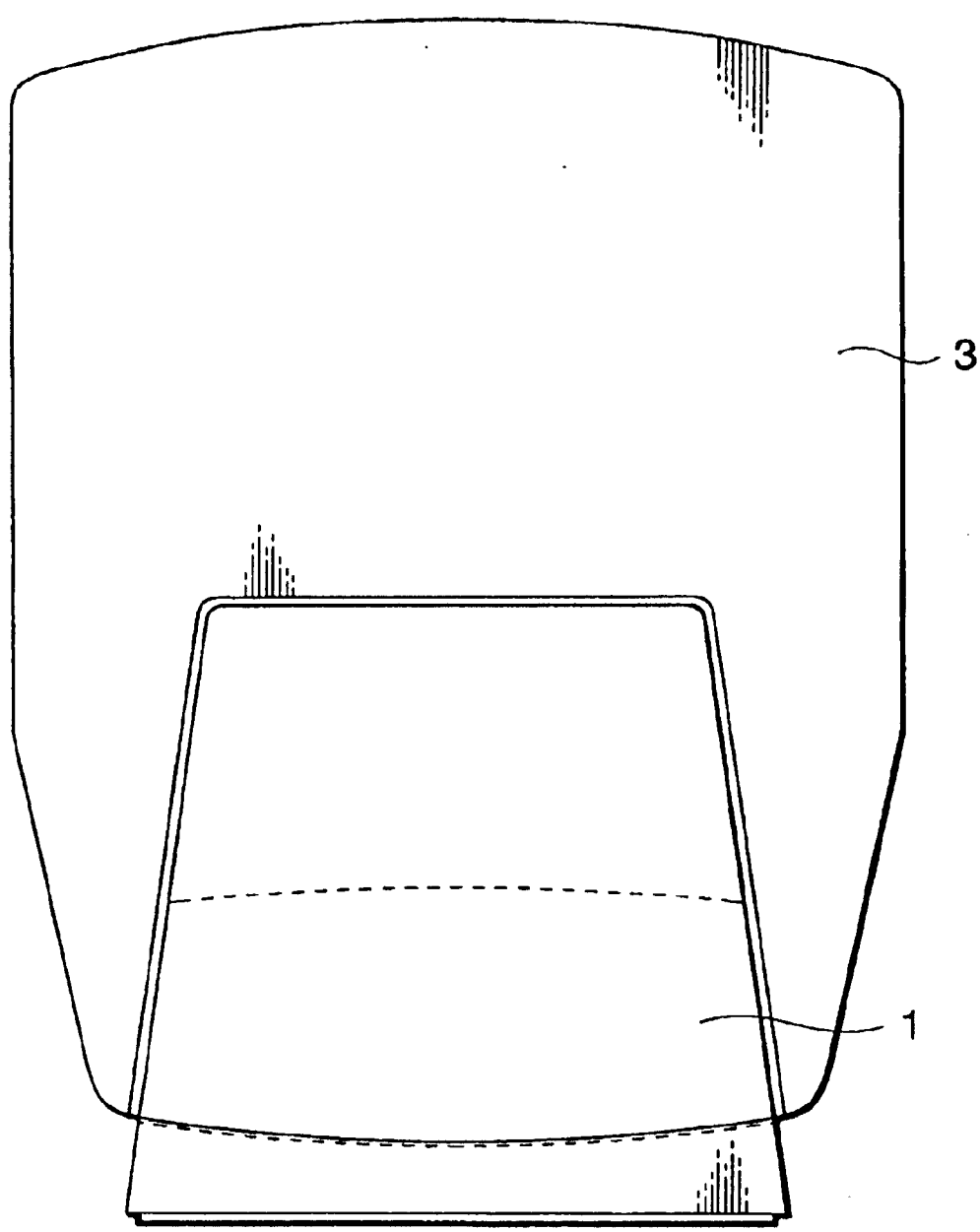
FIG. 12 shows a back-side structure of the information processing apparatus in a state that the terminal 3 is mounted on the base 1.

As shown in FIG. 8, the telephone 2 is provided with a speaker 32 and a microphone 33 at upper and lower positions, respectively. Buttons 31 for input of numbers etc. are provided between the speaker 32 and the microphone 33.

Figure 13:
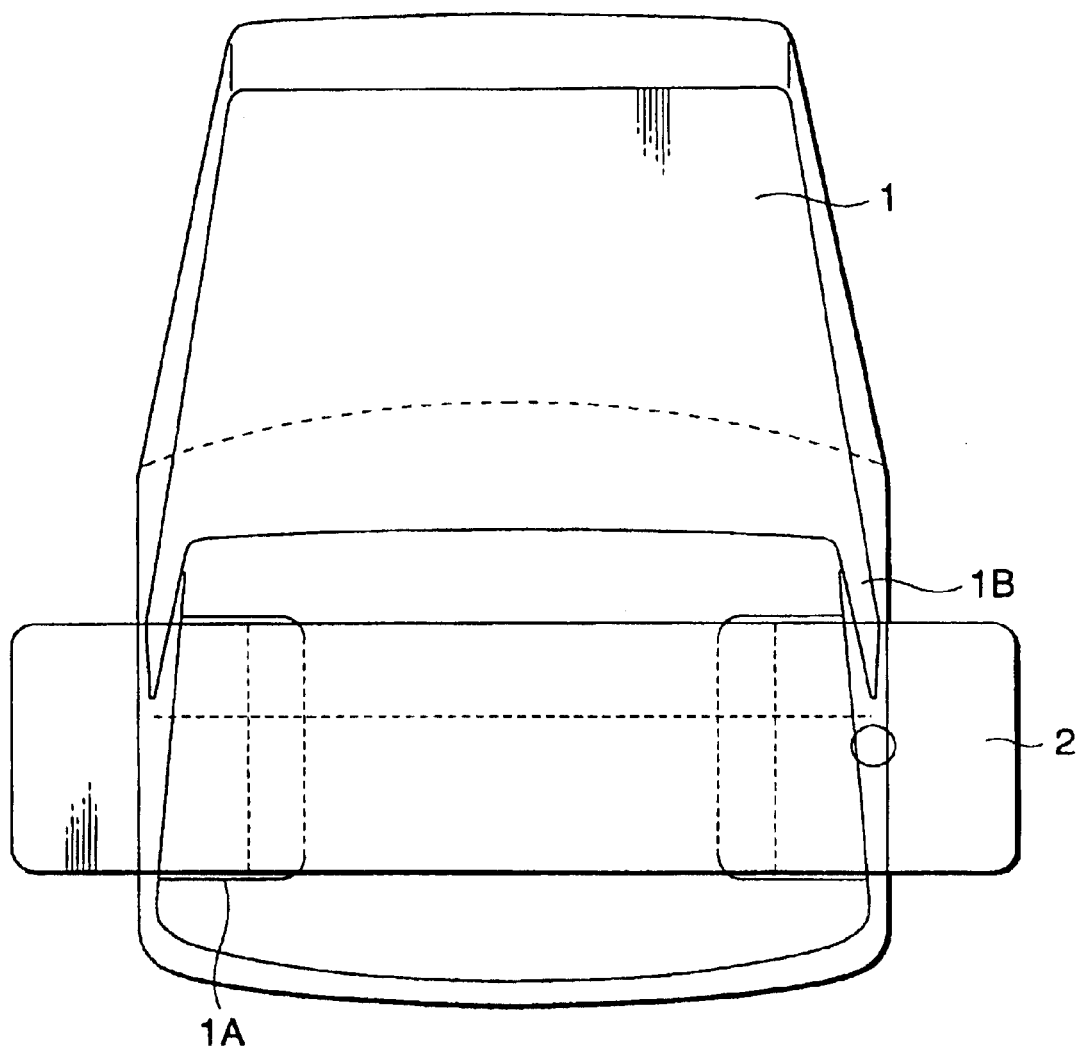
FIG. 13 shows a front-side structure of the information processing apparatus in a state that the telephone 2 is mounted on the base 1.
Figure 14:
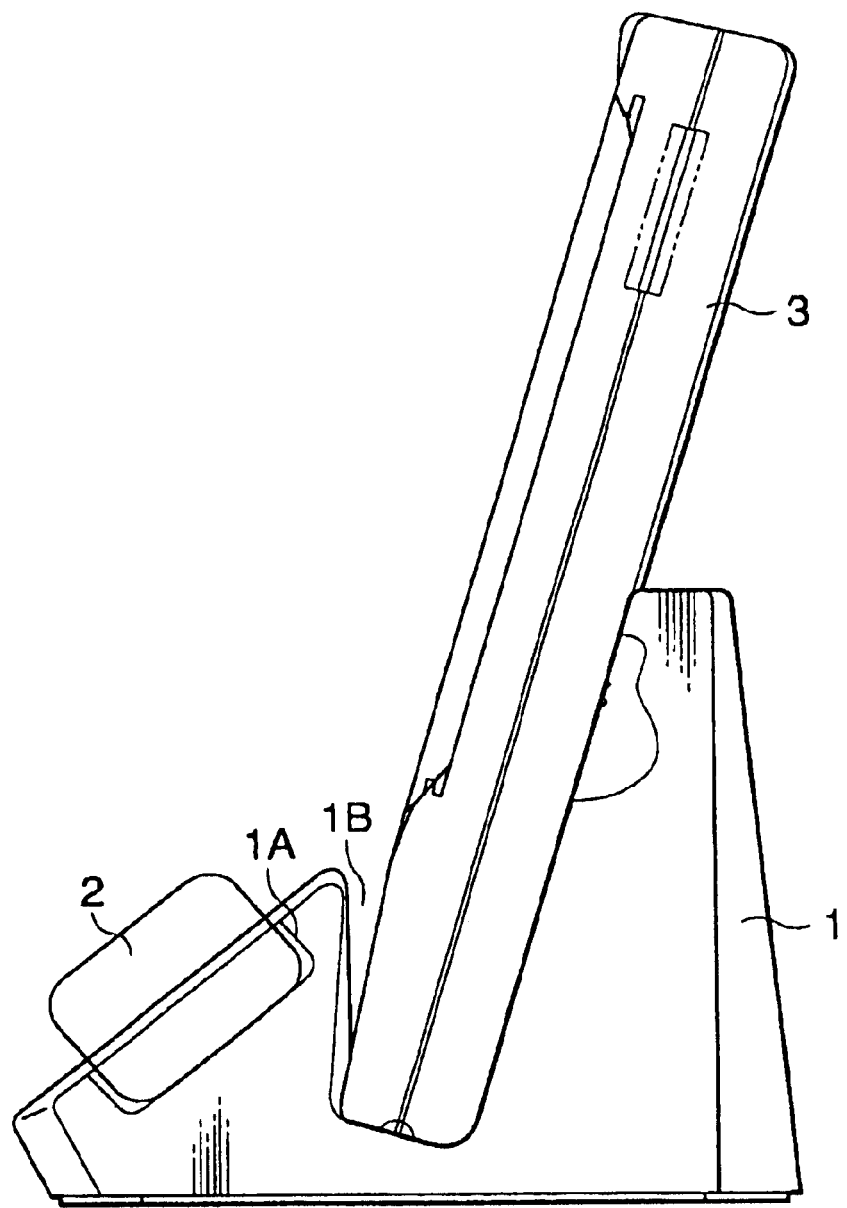
FIG. 14 shows a side structure of the information processing apparatus in a state that the telephone 2 and the terminal 3 are mounted on the base 1.

As shown in FIGS. 13 and 14, the base 1 has recesses 1A and 1B for accommodating the telephone 2 and the terminal 3, respectively.

Although not shown in any of FIGS. 1–14, contacts for supplying power from a charger 42 (see FIG. 15) of the base 1 to a secondary battery 35 (see FIG. 15) that is incorporated in the telephone 2 are provided between the base 1 and the telephone 2. Similarly, contacts for supplying power from the charger 42 of the base 1 to a secondary battery 66 (see FIG. 15) of the terminal 3 are provided between the base 1 and the terminal 3.

Figure 15:
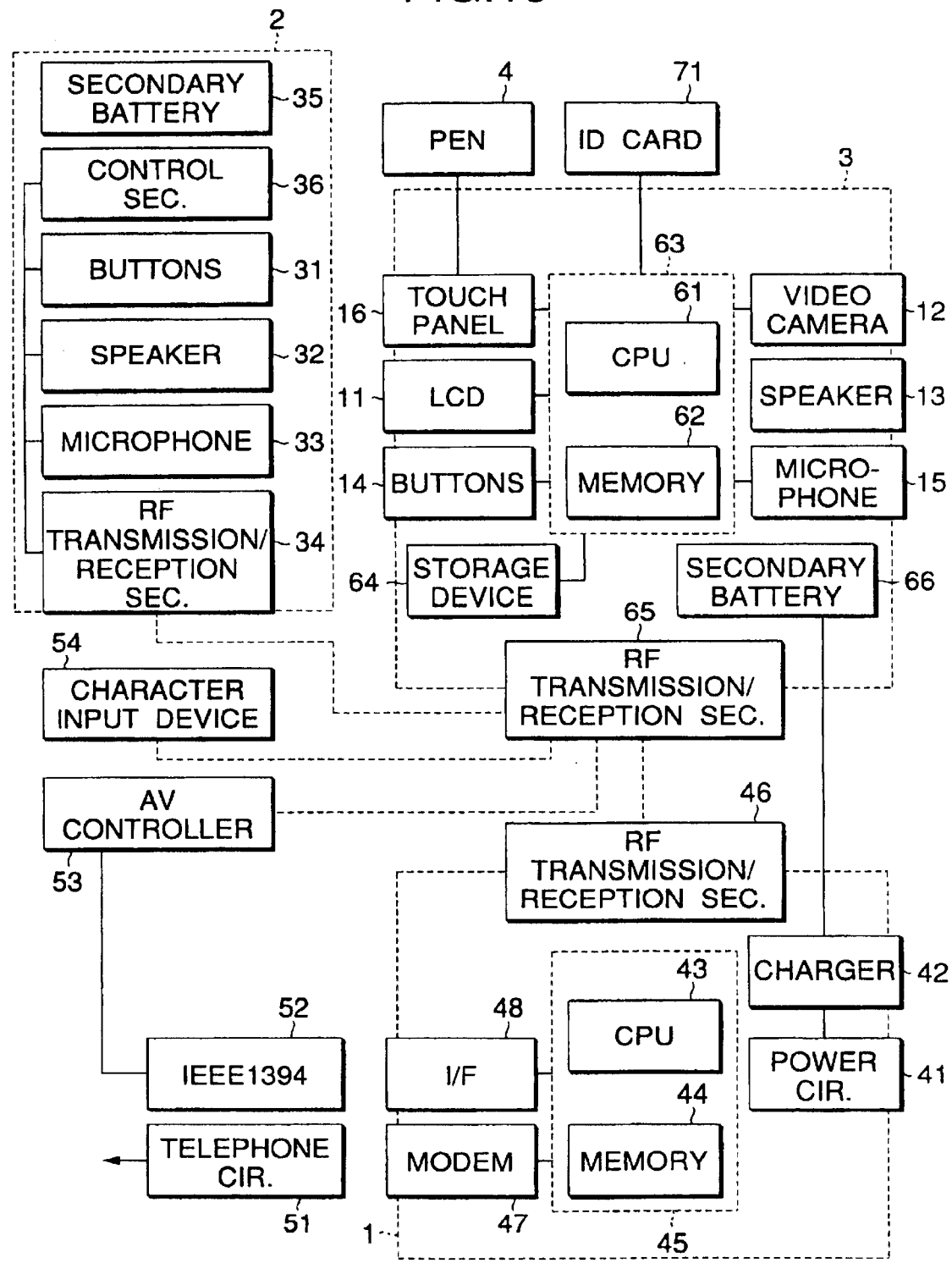
FIG. 15 is a block diagram showing an internal configuration of the base 1, the telephone 2, and the terminal 3.

FIG. 15 shows an example of internal electrical configuration of the base 1, the telephone 2, and the terminal 3. The base 1 is provided with a microcomputer 45 having a CPU 43 and a memory 44. The microcomputer 45 controls operations performed in the base 1. An RF transmission/reception section 46 exchanges, by radio, data with an RF transmission/reception section 65 of the terminal 3, an AV controller 53, or a character input device 54. A power circuit 41 supplies power to the respective sections in the base 1 as well as supplies charging power to a secondary battery 66 of the terminal 3 and a secondary battery 35 of the telephone via a charger 42.

A modem 47 performs interface processing of a communication between a telephone circuit 51 and the microcomputer 45. An interface 48 performs interface processing of data that is exchanged between the external AV controller 53 and the microcomputer 45 via an IEEE (Institute of Electrical and Electronics Engineers) 1394 bus 52.

In the telephone 2, the secondary battery 35 supplies power to the respective sections. A control section 36 controls an RF transmission/reception section 34 in accordance with an instruction from buttons 31, and makes it exchange data with the RF transmission/reception section 65 of the terminal 3 or the RF transmission/reception section 46 of the base 1. A microphone 33 captures an audio signal originating from a user and outputs it to the RF transmission/reception section 34. A speaker 32 outputs an audio signal that is supplied from the RF transmission/reception section 34.

The terminal 3 is provided with a microcomputer 63 having a CPU 61 and a memory 62. The microcomputer 63 controls various operations performed in the terminal 3. The touch panel 16 captures data that is input with the pen 4 and supplies the captured data to the microcomputer 63. The microcomputer 63 executes various processes in accordance with a manipulation signal from buttons 14 or an input from the RF transmission/reception section 65, and makes the LCD 11 perform proper display and stores various information in the memory 62 or a storage device 64.

Being a solid-state memory or a hard disk drive, the storage device 64 stores an E-mail message and facsimile data that are transmitted externally, audio data that is transmitted via the telephone 2, and other data. The RF transmission/reception section 65 supplies the microcomputer 63 with data that is input, by radio, from the RF transmission/reception section 46 of the base 1 or the RF transmission/reception section 34 of the telephone 2, or data that is input, by radio, from the AV controller 53. Further, the RF transmission/reception section 65 can receive character data that is transmitted by radio from the character input device 54.

When an ID card 71 is inserted in the terminal 3, the microcomputer 63 can read it and thereby identify a user. Further, the microcomputer 63 supplies data that is captured with the video camera 12 or the microphone 15 to the RF transmission/reception section 46 of the base 1, the RF transmission/reception section 34 of the telephone 2, or the AV controller 53 via the RF transmission/reception section 65. The speaker 13 emits sound based on an audio signal of a prescribed form that is input from the microcomputer 63. The secondary battery 66 supplies necessary power to the respective section of the terminal 3.

Next, an operation of the terminal 3 will be described with reference to a flowchart of FIGS. 16 and 17. As soon as the power of the terminal 3 is turned on, the CPU 61 executes a process of automatically recording E-mail or facsimile data when it is transmitted via the telephone circuit 51. Specifically, upon reception of such data via the modem 47, the CPU 43 of the base 1 makes the RF transmission/reception section 46 transmit, by radio, the received data to the RF transmission/reception section 65 of the terminal 3. Upon reception of that data via the RF transmission/reception section 65, the CPU 61 of the terminal 3 stores it in the storage device 64.

Figure 16:
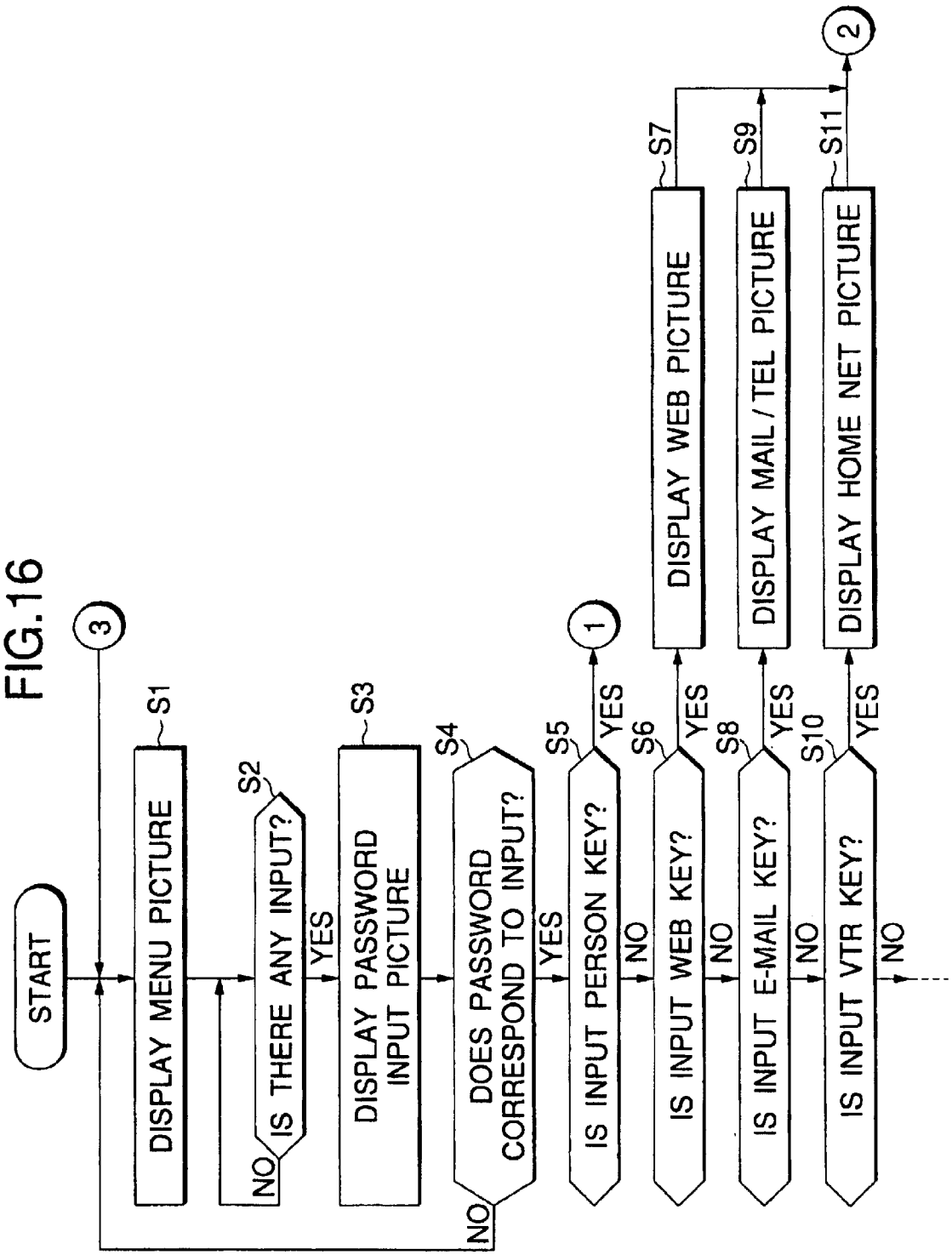
FIGS. 16 and 17 are a flowchart showing an operation of the terminal 3.
Figure 17:
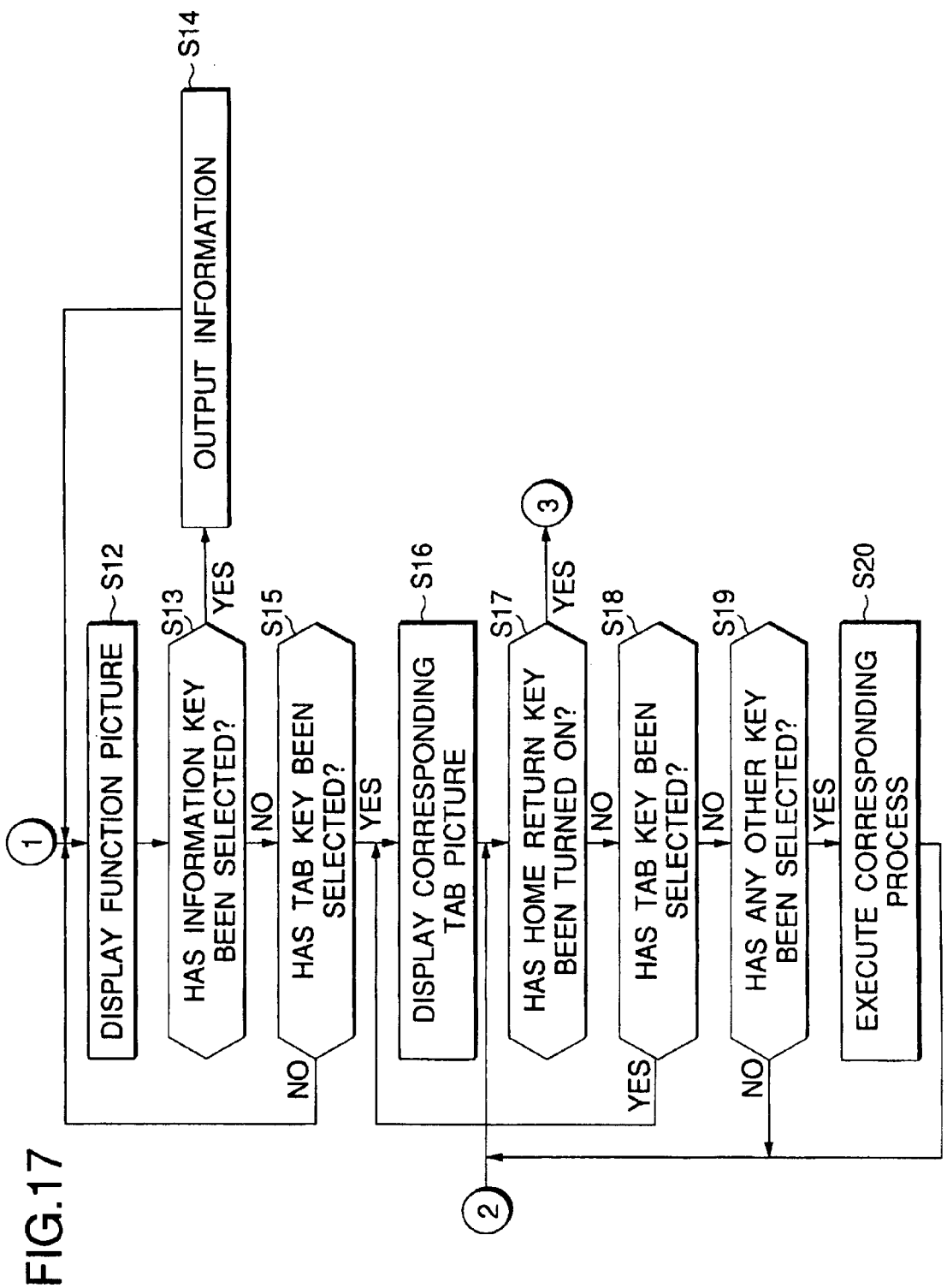
Figure 18:
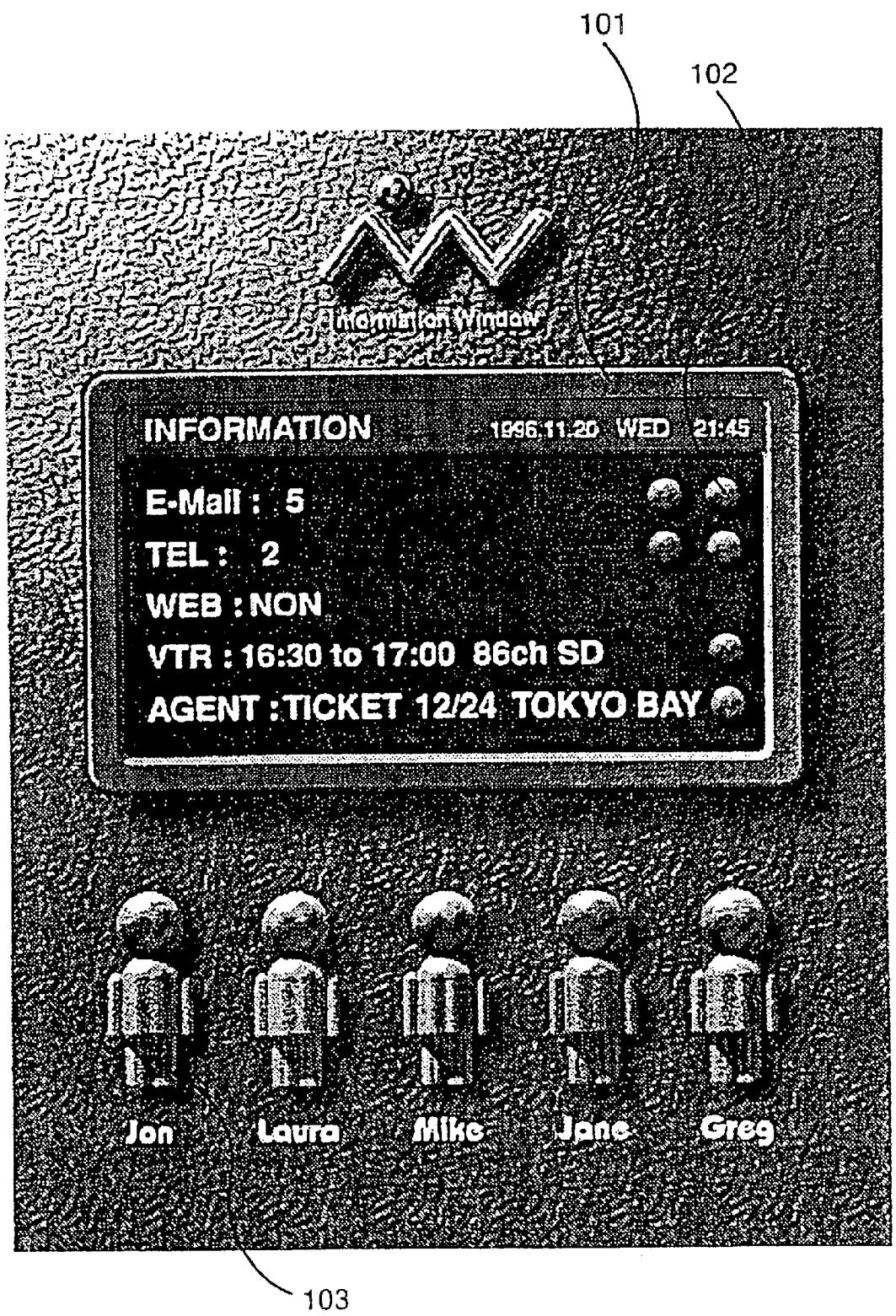
FIGS. 18–24 are photographs of display examples on a LCD of the terminal 3.

Whereas always executing the above process, the CPU 61 also executes the process shown in FIGS. 16 and 17. At step the CPU 61 executes a process of displaying a menu picture. Specifically, the CPU 61 generates menu picture data as shown in FIG. 18, and outputs it to the LCD 11 to make the LCD 11 display a menu picture. A display example of FIG. 18 includes five symbols 103 that symbolize the human shape. Names corresponding to the respective symbols 103 are shown under the respective symbols 103. That is, the symbols 103 are correlated with respective family members of a home in which the information processing apparatus is used and the names of the family members are shown under the respective symbols 103. The names are registered in the storage device 64 by a user by manipulating the character input device 54 in each home.

In the display example of FIG. 18, the names Jon, Laura, Mike, Jane, and Greg are allocated to the respective symbols 103 in order from the left. The symbols 103 have different colors, for instance, blue, green, gray, pink, and yellow in order from the left.

A window 101 is shown approximately at the center of the menu picture, and various information that is exchanged via the telephone circuit 51 is shown in the window 101. In this display example, the information shown in the window 101 includes the number (5) of received E-mail and the number (2) of of received telephone calls (item "TEL"). In the information processing apparatus, news delivery is made via the telephone circuit 51. Whether delivery has been made is indicated by the item "WEB." In this example, the item "WEB" is associated with characters "NON" because no delivery has been made.

When recording is reserved with respect to a video tape recorder (VTR) (not shown) that is connected the AV controller 53 via the IEEE 1394 bus 52, the details of the reservation are shown at the item "VTR." In this display example, the reservation is such that a broadcast program on the 86th channel will be recorded from PM 4:30 to 5:00.

Further, assume a case that reservation of a ticket was requested to a certain agent through the Internet, for instance. In the display example of FIG. 18, if a reservation result of the ticket has been transmitted from the agent through the Internet, it is shown at the item "AGENT."Marks 102 are shown at the right end of the window 101 in association with each information. Each mark 102 has the same color as the corresponding symbol 103. For example, if the two marks 102 located on the right of the item "E-Mail" have colors blue and gray, it means that E-mail messages have been transmitted to Jon and Mike who are given the blue and gray symbols 103, respectively, and stored in the storage device 64. If the marks 102 located on the right of the item "TEL" have colors pink and blue, it means that telephone calls arrived that were directed to Jane and Jon who are given the pink and blue symbols 103, respectively. If the mark 102 located on the right of the item "VTR" has a color yellow, it means a reservation by Greg who is given the yellow symbol 103. Similarly, if the mark 102 located on the right of the item "AGENT" has a color green, it means that this information is directed to Laura who is given the green symbol 103.

At step S2, the CPU 61 waits until reception of an input. When a certain input is made, the process goes to step S3, where a password input picture display process is executed. At this step, the CPU 61 causes the LCD 11 to display a password input picture that is exemplified in FIG. 19. Buttons 121 are shown at a lower position of this picture. A user inputs his own password by touching desired ones of the buttons 121. Naturally, the password of each user (i.e., each symbol 103) has been input in advance and registered in the storage device 64.

At step S4, the CPU 61 judges whether the password that has been input by the user corresponds to the input that was made at step S2. If the input password does not correspond to the input of step S2, the process returns to step S1, where a menu picture is again displayed.

For example, when a user touches the item "E-Mail" with the pen 4 in a state that the menu picture of FIG. 18 is displayed, E-mail messages can be read out from the storage device 64. In this example, only the E-mail messages directed to Jon and Mike who are give the blue and gray symbols 103, respectively, have been received at the present time. Therefore, to secure the users' privacy, even if Laura, for instance, touches the item "E-Mail" with the pen 4, no E-mail messages should be displayed as long as a password that is input by her is not Jon's or Mike's password. To this end, if it is judged at step S4 that the input password does not correspond to the input of step S2, the process is prohibited from going to the following steps.

In this example, if an instruction to read out E-mail information is made at step S2 and Jon's or Mike's password is input, the input password should correspond to the input of step S2. If this is the case, the process goes to step S5, where it is judged whether the item touched with the pen 4 at step S2 is a person key (i.e., symbol 103). If the touched item is a symbol 103, it means that the user intends to do something by using the terminal 3. Therefore, the process goes to step S12.

If it is judged at step S5 that the touched item is not a symbol 103, the process goes to step S6, where it is judged whether the touched item is the item "WEB" (WEB key). If the touched item is the WEB key, the process goes to step S7, where the CPU 61 executes a WEB picture display process. That is, the CPU 61 causes the LCD 11 to display a picture as exemplified in FIG. 20 as a WEB picture for accessing a given server through the Internet, for instance.

Figure 21:
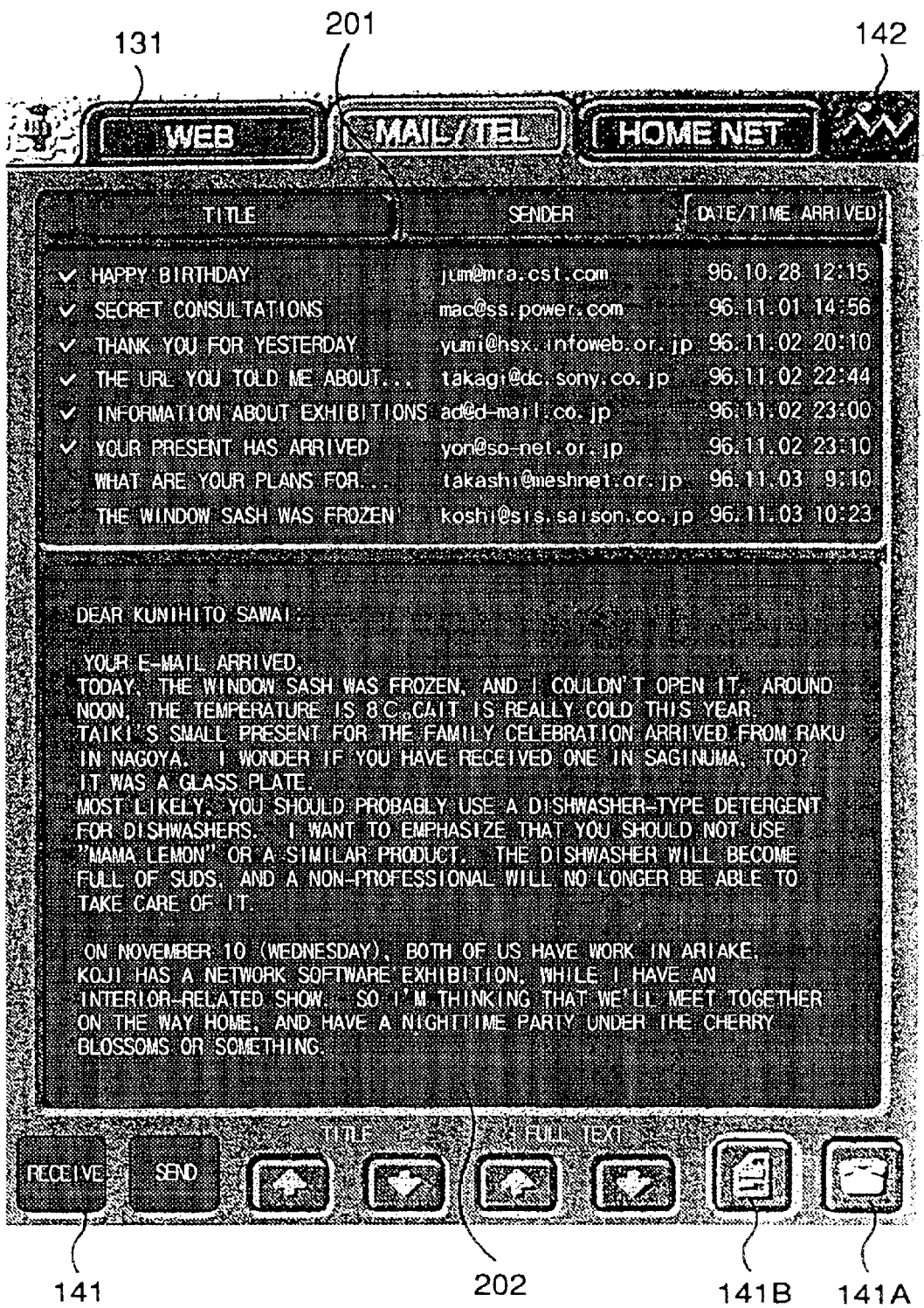

If it is judged at step S6 that the touched item is not the WEB key, the process goes to step S8, where it is judged whether the touched item is the E-mail key. If it is judged that the touched item is the E-mail key, the process goes to step S9, where a MAIL/TEL picture display process is executed. That is, the CPU 61 causes the LCD 11 to display a MAIL/TEL picture as shown in FIG. 21. E-mail messages so far received are read out from the storage device 64 and shown in this picture. More correctly, only E-mail massages directed to the user (symbol 103) corresponding to the input password are displayed. With this measure, the privacy of a plurality of family members can be secured even in a case where the terminal 3 is shared by them.

Figure 22:
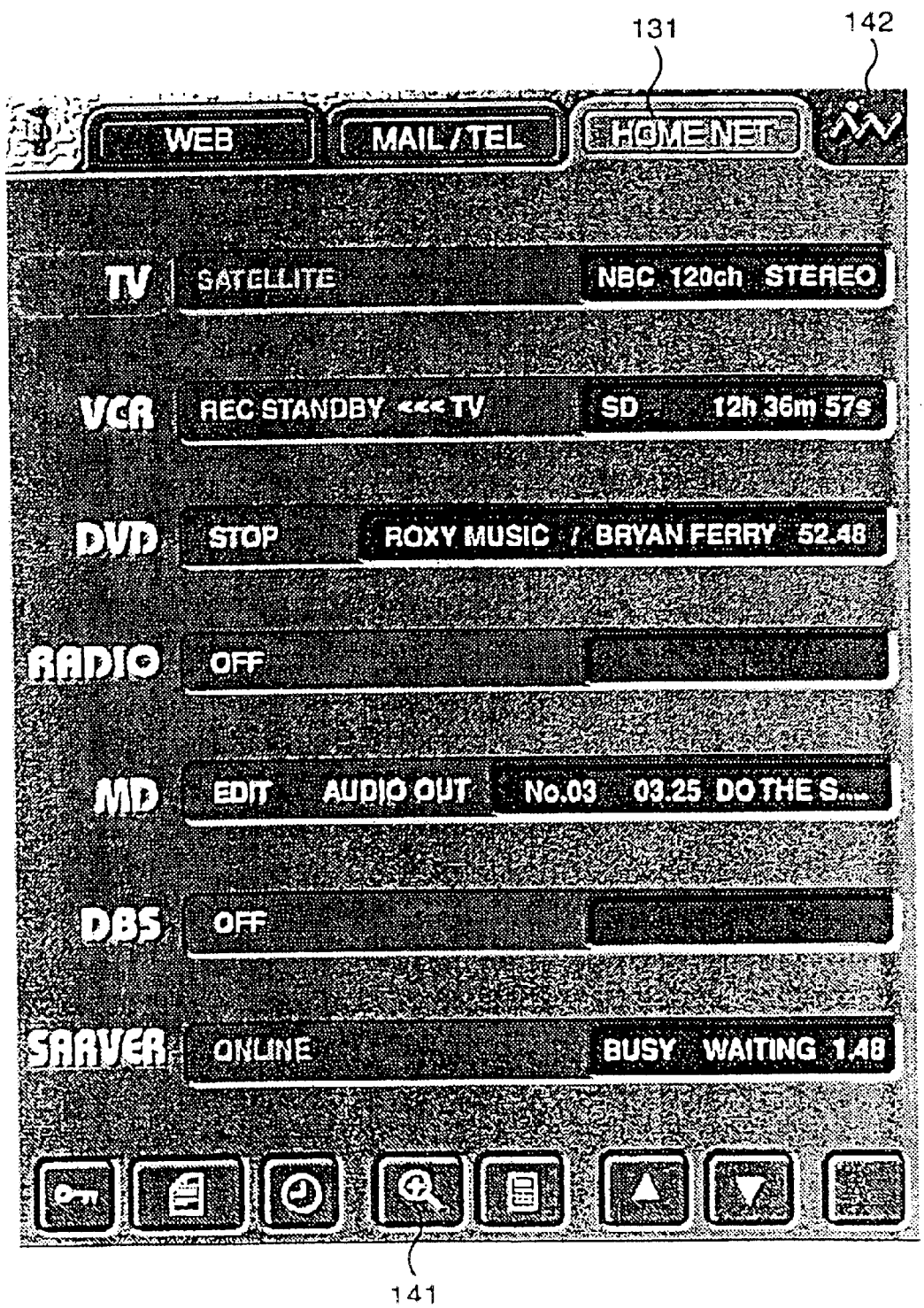

On the other hand, if it is judged at step S8 that the touched item is not the E-mail key, the process goes to step S10, where it is judged whether the touched item is the item "VTR" (VTR key). If it is judged that the touched item is the VTR key, the process goes to step S11, where a HOME NET picture display process is executed. In this case, a HOME NET picture as shown in FIG. 22 is displayed on the LCD 11.

If it is judged at step S10 that the touched item is not the VTR key, it is judged which of the remaining keys was touched and a process corresponding to a judgment result is executed.

Figure 23:
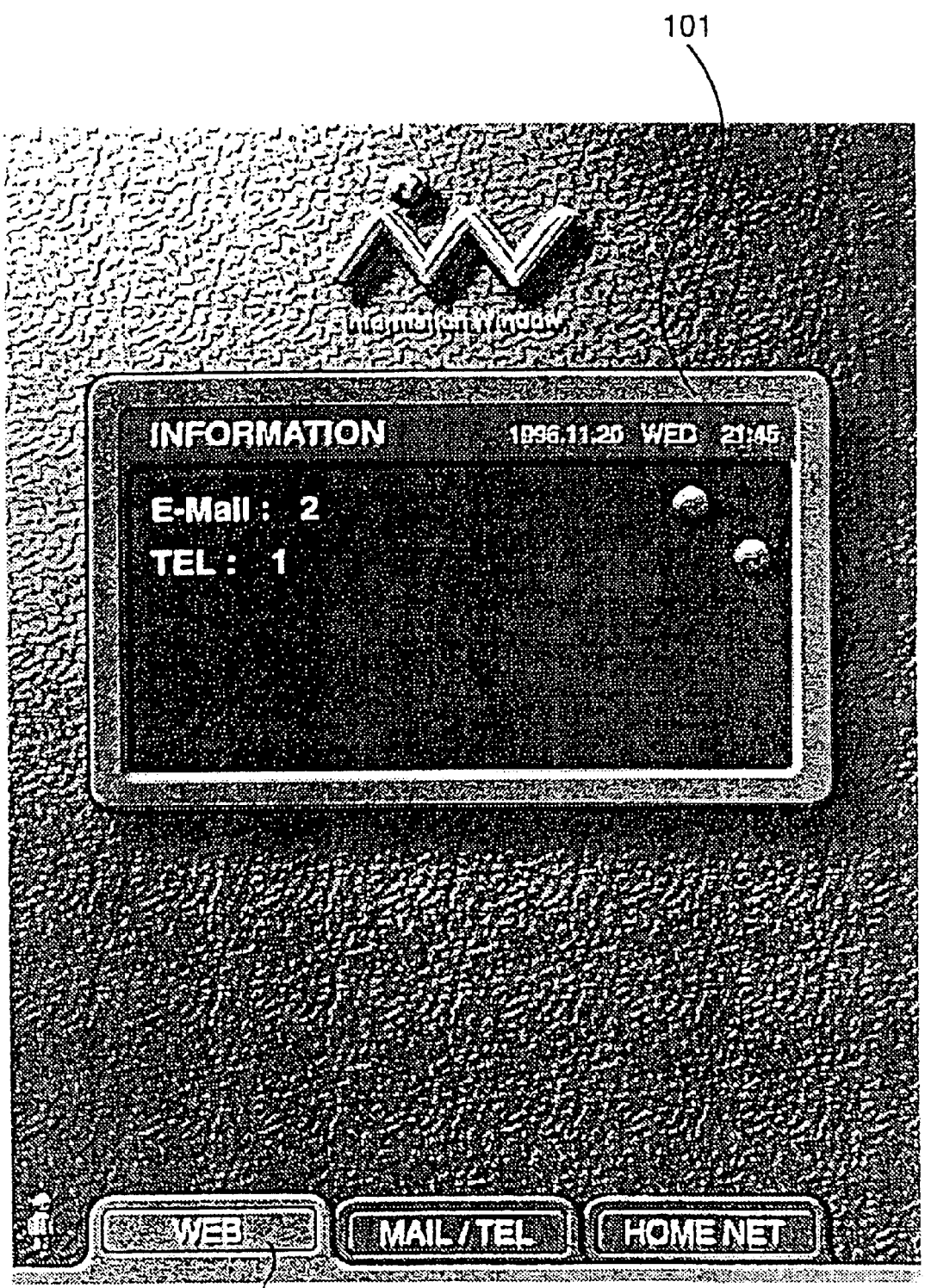

On the other hand, if it is judged at step S5 that the a person key (symbol 103) was touched on the menu picture, the process goes to step S12 where the CPU 61 executes a function picture display process. That is, the CPU 61 causes the LCD 11 to display a function picture as exemplified in FIG. 23. The number (2) of E-mail messages directed to the symbol 103 corresponding to the password that was input to the window 101 and the number (1) of telephone calls (item "TEL") directed to the same symbol 103 are shown in this function picture. The display example of FIG. 23 is of a case where the user of the blue symbol 103 input his password. While in the menu picture of FIG. 18 the number of E-mail messages is 5 and the number of telephone calls is 2 (the number of E-mail messages or telephone calls directed to all family members and stored in the storage device 64), the function picture of FIG. 23 shows the number of only the E-mail messages or telephone calls directed to Jon who is given the blue symbol 103.

When a user wants to see, for instance, E-mail messages, he touches the characters "E-Mail" (information key) shown in FIG. 23 with the pen 4. At step S13, the CPU 61 judges whether an information key has been selected. If it is judged that an information key has been selected, the process goes to step S14, where the CPU 61 reads out information corresponding to the selected information key and causes the LCD 11 to display it. For example, when a user has selected the information key of "E-Mail", the CPU 61 causes the LCD 11 to display a MAIL/TEL picture as shown in FIG. 21 and show E-mail messages directed to Jon of the blue symbol 103 (the E-mail messages shown in the display example of FIG. 21 are not ones directed to Jon).

As shown in FIG. 23, three tabs 131 of "WEB," "MAIL/ TEL," and "HOME NET" are shown at the bottom. By selecting one of those tabs 131, a transition to the corresponding mode is effected. The tab "WEB" is selected in the case of accessing a given server through the Internet, for instance. The tab "MAIL/NET" is selected in the case of transmitting E-mail or making a telephone call. The tab "HOME NET" is selected in the case of controlling an electronic device connected to the IEEE 1394 bus 52.

If it is judged at step S13 that no information key has been selected, the process goes to step S15, where it is judged whether any of the three tabs 131 has been selected. If it is judged none of the tabs 131 have been selected, the process goes to step S12 to repeat the ensuing process.

Figure 20:
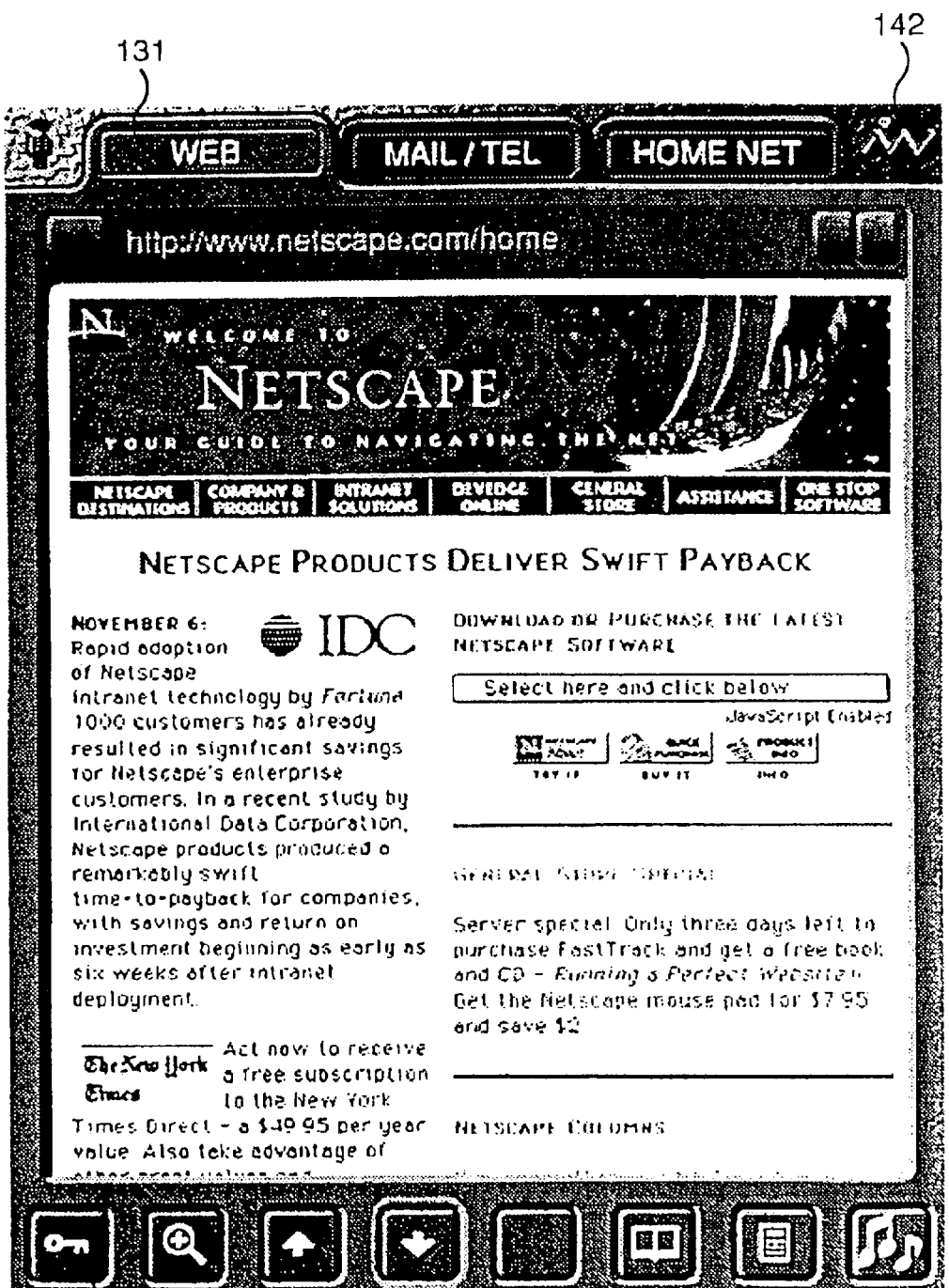

If it is judged at step S15 that one of the tabs 131 has been selected, the process goes to step S16, where a transition to the corresponding mode is made and a picture corresponding to the selected tab 131 is displayed. For example, when the tab "WEB" has been selected, the WEB mode is established and a WEB picture as shown in FIG. 20 is displayed on the LCD 11. When the tab "MAIL/TEL" has been selected, the MAIL/TEL mode is established and a MAIL/TEL picture as shown in FIG. 21 is displayed. When the tab "HOME NET" has been selected, the HOME NET mode is established and a HOME NET picture as shown in FIG. 22 is displayed.

A button 142 as a home return key is shown at the top-right corner of each of the displayed pictures of the three respective modes shown in FIGS. 20–22. The button 142 is manipulated to return to the menu picture in a state that one of the three modes is established. Therefore, in a state that one of the pictures of FIGS. 20–22 is displayed, it is judged at step S17 whether the home return key (button 142) has been turned on. If it is judged that the home return key has been turned on, the process returns to step S1, where the CPU 61 causes the LCD 11 to display a menu picture as shown in FIG. 18.

If it is judged at step S17 that the button 142 has not been manipulated, the process goes to step S18, where it is judged whether a tab key has been selected. As shown in FIGS. 20–22, three tab keys 131 are shown in the picture of each mode. A transition to another mode can be effected in each mode by selecting the corresponding tab key. Among the three tabs 131, the tab of the current mode is shown above the other tabs to allow a user to recognize the current mode.

At step S18, it is judged whether any of the three tabs 131 has been selected. If it is judged that one of the tabs 131 has been selected, the process goes to step S16, where a transition to the mode corresponding to the selected tab is made and a picture of the selected mode is displayed.

If it is judged at step S18 that none of the tabs 131 have been selected, the process goes to step S19, where it is judged whether any of the other buttons (keys) has been selected. If it is judged that none of the other buttons have been selected, the process returns to step S17 to repeat the ensuing process. If it is judged at step S19 that one of the other buttons has been selected, the process goes to step S20, where a process corresponding to the selected button is executed.

Figure 24:
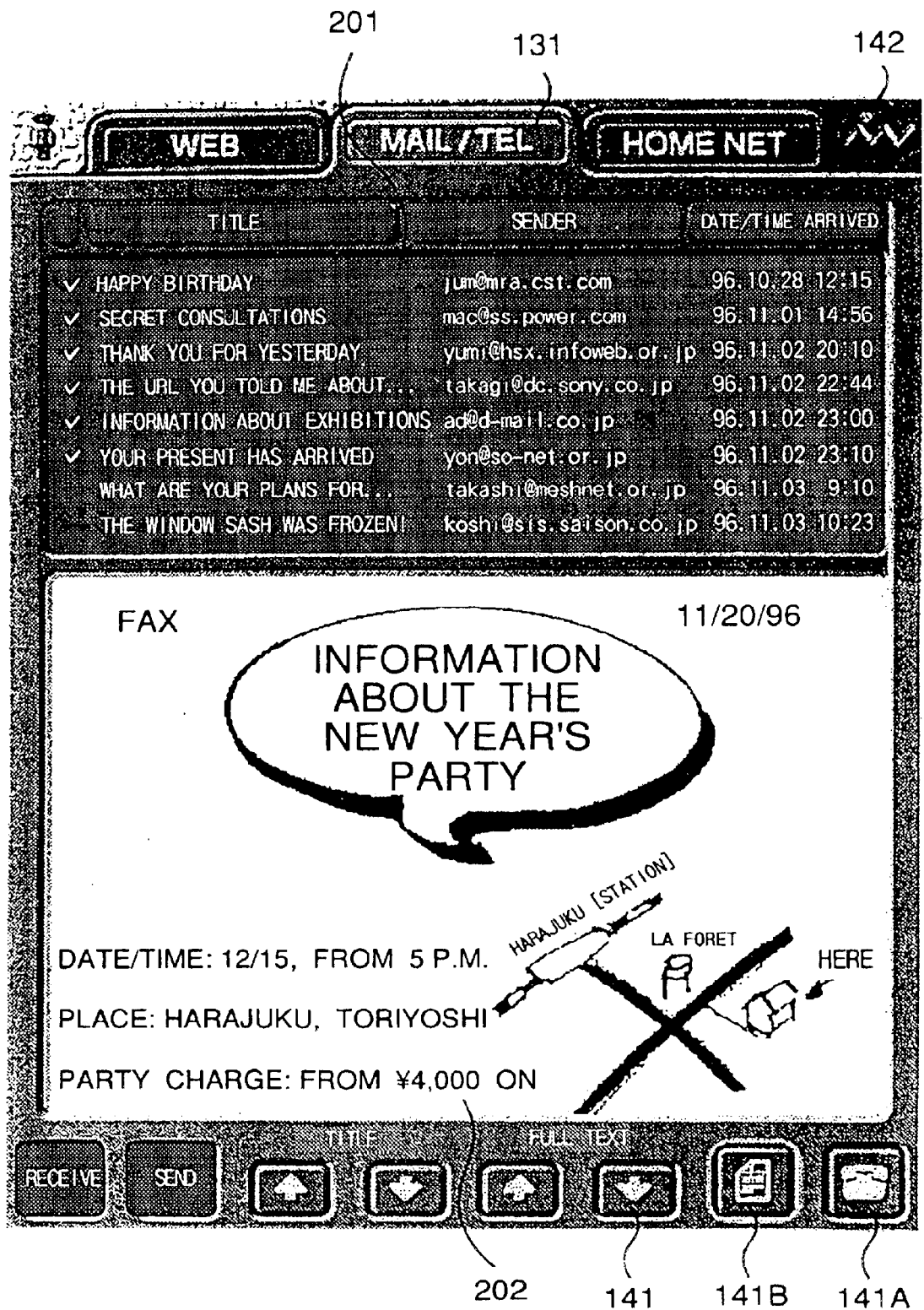

For example, when a desired E-mail message is selected from the list of previously received E-mail messages that is shown in a window 201 in the MAIL/TEL picture of FIG. 21 by moving the cursor, the information of the newly selected E-mail is shown in a bottom window 202. FIG. 24 shows a state that the contents of another E-mail is displayed. In the display example of FIG. 24, information that has been received via facsimile is displayed in the window 202.

As described above, in the embodiment of the invention, the E-mail information and the facsimile information are handled as substantially the same type of information.

Next, the process of the MAIL/TEL mode will be described in detail with reference to a flowchart of FIGS. 25–28. This process is executed in a state that any of MAIL/TEL pictures shown in FIGS. 21–24 is displayed (i.e., in the MAIL/TEL mode).

First, at step S31, the CPU 61 judges whether an input for a received mail selection process has been made. As described above, this selection is done by selecting a desired one from the received mail list shown in the window 201 of, for instance, FIG. 21 by using the cursor. When a certain mail message has been selected, the process goes to step S32, where the selected mail is read out from the storage device 64 and displayed on the LCD 11. That is, when another received mail message is selected in a state that a certain received mail message is displayed as shown in FIG. 21, the newly selected mail is displayed in the window 202 as shown in FIG. 24.

If it is judged at step S31 that none of the received mail messages have been selected, the process goes to step S33, where it is judged whether a mail button (for instance, a button 141B shown in FIG. 21) has been selected. If the mail button has been selected, the process goes to step S34, where a mail generation picture display process is executed.

If it is judged that the mail button (button 141B) has not been turned on, the process goes to step S41, where it is judged whether a telephone button (for instance, a button 141A shown in FIG. 21) has been turned on. The button 141A is manipulated in the case of making a telephone call or receiving a call. If it is judged that the button 141A has been turned on, the process goes to step S42, where a video phone picture display process is executed.

On the other hand, if it is judged at step S41 that the button 141A has not been turned on, the process goes to step S43, where it is judged whether any of the other ones of the buttons 141 shown in FIG. 21 has been turned on. If it is judged that one of those buttons has been turned on, the process goes to step S44, where a process corresponding to the manipulated button is executed. If it is judged that none of those buttons have been turned on, the process returns to step S31 to repeat the ensuing process.

Figure 29:
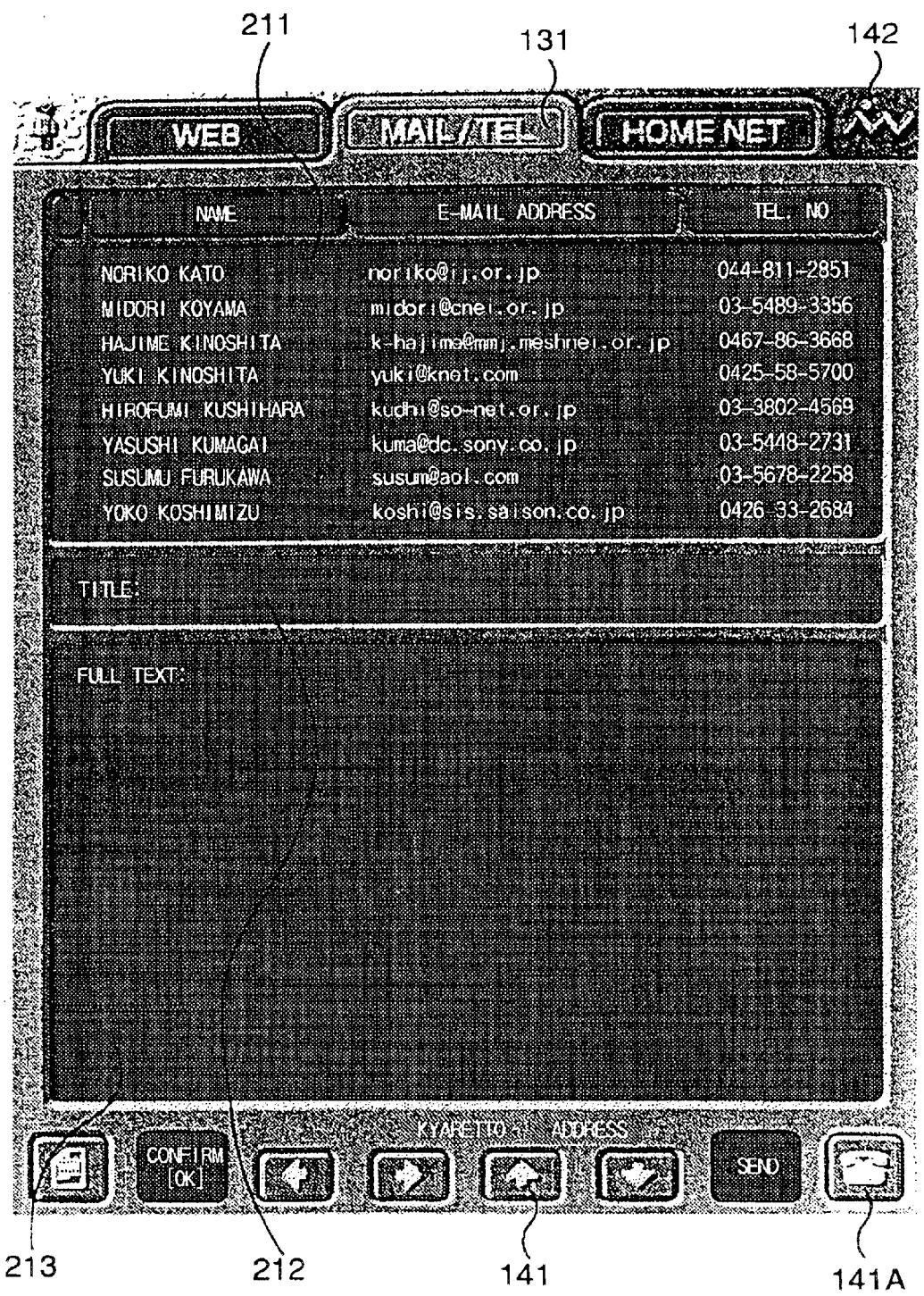
FIGS. 29–32 are photographs of display examples on the LCD of the terminal 3.

If it is judged at step S33 that the mail button 141B has been turned on, the process goes to step S34, where the mail generation picture display process is executed and a mail generation picture as exemplified in FIG. 29 is displayed on the LCD 11. In the display example of FIG. 29, a table stored in the storage device 64 and correlating E-mail addresses (URLs) with telephone numbers is displayed in a window 211 together with the names of related persons. A space where to input a title of mail to be transmitted is displayed in a window 212 under the window 211. A space where to input a body of the mail to be transmitted is displayed in a window 213 under the window 212.

In a state that this type of mail generation picture is displayed, a user generates mail to be transmitted at step S35. For example, when the user wants to write E-mail, for instance, he inputs a title and a body by manipulating the character input device 54. The characters thus input are transmitted by radio and received by the RF transmission/reception section 65. Upon reception of a signal of the input characters, the CPU 61 causes the LCD 11 to display the text data at a proper position (window 212 or 213).

On the other hand, when the user wants to generate facsimile mail, he causes the AV controller 53 to read out a document for transmission with a scanner (not shown) and transmit data of the read-out document to the RF transmission/reception section 65 by radio. Alternatively, the AV controller supplies the data to the base 1 via the IEEE 1394 bus 52 and the data is then transmitted from the RF transmission/reception section 46 by radio and captured by the RF transmission/reception section 65. The CPU 61 causes the CPU 213 to display the facsimile image data thus captured.

At step S36, the user judges whether to transmit E-mail. If E-mail is to be transmitted, the process goes to step S37, where the user selects the mail address (URL) of a person to whom the mail is to be sent from the correlation table shown in the window 211 of FIG. 29. This is done by moving the cursor to the corresponding position. If the selection is made, the process goes to step S38, where the CPU 61 executes a process of sending the E-mail that was written at step S35 to the person (URL) that was selected at step S37.

Specifically, the CPU 61 requests, via the RF transmission/reception section 65, the CPU 43 of the base 1 to send the E-mail and outputs the data of the E-mail to be sent. The CPU 43 of the base 1 captures the command and data via the RF transmission/reception section 46 and controls the modem 47 to make it access the person of the specified URL. The CPU 61 then causes the modem 47 to send the E-mail to the person (URL) accessed.

If it is judged at step S36 that the mail to be sent is not E-mail, it means that a facsimile message should be sent. Therefore, the process goes to step S39, where the user selects the telephone number of a person to whom a facsimile message is to be sent from the correlation table shown in the window 211 of FIG. 29. This is done also by moving the cursor to the position of the telephone number of that person. When a telephone number has been selected, the process goes to step S40, where the CPU 61 executes a process of sending the facsimile document that was generated at step S35 to the facsimile machine of the telephone number that was specified at step S39. Also in this case, the CPU 61 supplies a transmission command and data to the base 1 via the RF transmission/reception section 65. In the base 1, the CPU 43 receives the command and data via the RF transmission/reception section 46 and controls the modem 47 to make it transmit the facsimile data to the specified person via the telephone circuit 51.

Figure 30:
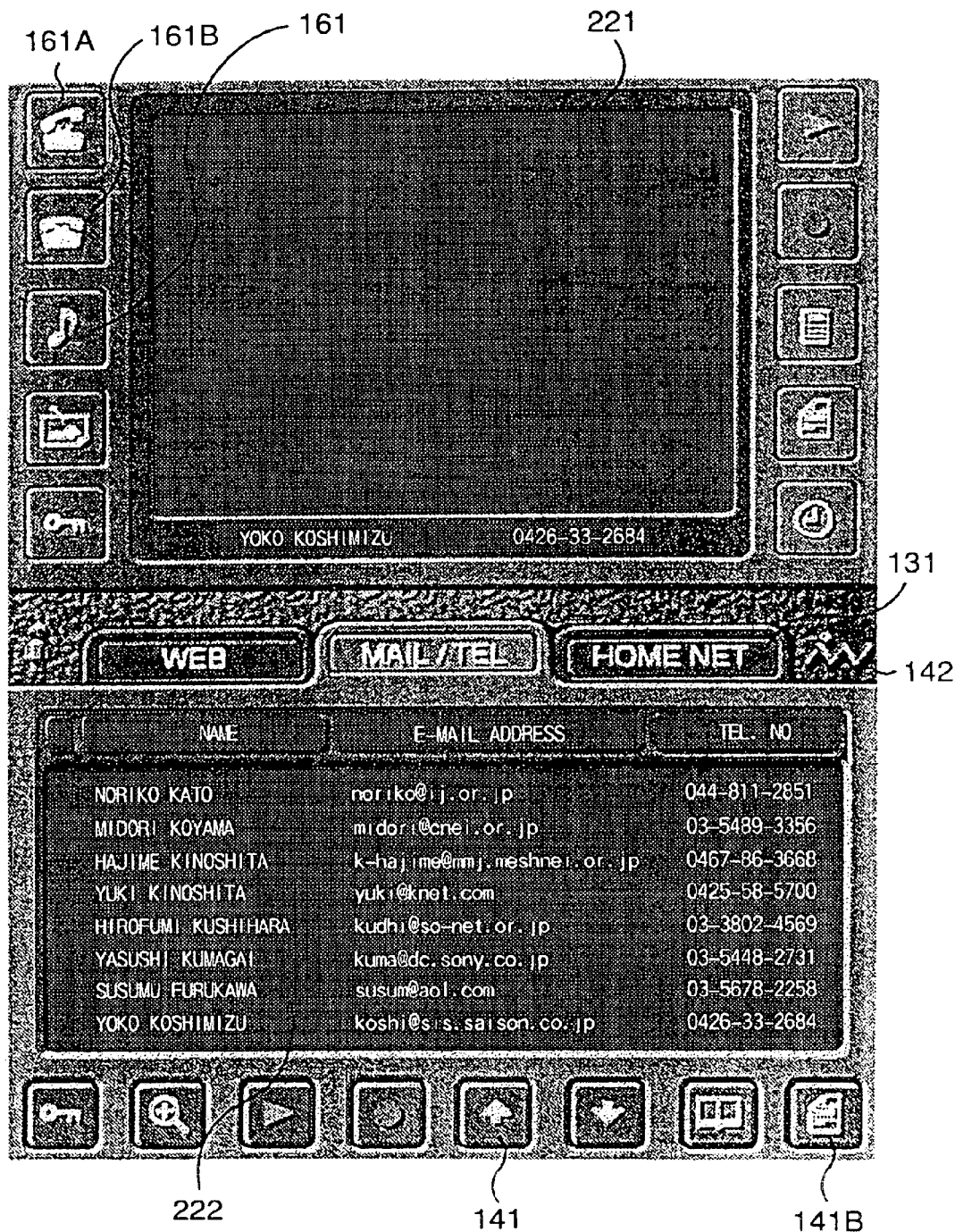

On the other hand, if it is judged at step S41 that the button 141A (telephone button) shown in FIG. 21 has been turned on, the process goes to step S42, where a video phone picture display process is executed and a video phone picture as exemplified in FIG. 30 is displayed on the LCD 11. In this display example, a screen for displaying an image of a person to talk with is displayed in a top window 221 and a table indicating a correlation among names of persons, mail addresses, and telephone numbers is displayed in a window 222. The correlation table displayed in the window 22 is the same as that displayed in the window 211 of FIG. 29.

While in the picture of FIG. 29 for generating E-mail or a facsimile document the correlation table is displayed at the top position, in the picture of FIG. 30 for telephone conversation the correlation table is displayed at the bottom position. The reason for this arrangement is as follows. With the picture of FIG. 30, a user talks with the other person by telephone while watching his image that is displayed in the window 221. If the window 221 in which to display an image of the other person were is located at the bottom position (if the window 222 for the correlation table were located at the top position, the user would have downward-directed eyes in his image that is taken by the video camera 12 that is located at the top of the terminal 3. The arrangement of FIG. 30 is employed to avoid this problem. That is, by locating the window 221 in which to display the other person's image close to the video camera 12, the user's image can be captured with a proper angle.

In the state that the video phone picture is displayed in the above manner, the process goes to step S45, where it is judged whether a call from the other person has arrived. If it is judged that a call has arrived, the process goes to step S47, where a call arrival button (for example, a button 161A shown in FIG. 30) is caused to flash, whereby the user can recognize call arrival. At this time, the CPU 61 causes the speaker 13 to emit call arrival sound. At step S48, the CPU 61 judges whether the button 161A (call arrival button) has been turned on. If it is judged that the button 161A has not been turned on, the process returns to step S45 to repeat the ensuing process. If it is judged at step S48 that the button 161A (call arrival button) has been turned on, the process goes to step S49, where the CPU 61 executes call arrival process.

Specifically, the CPU 61 requests, via the RF transmission/reception section 65, the CPU 43 of the base 1 to execute a call arrival process. In response to this request, the CPU 43 controls the modem 47 and makes it to execute the call arrival process. As a result, the telephone circuit is closed.

When the telephone circuit has been closed, the process goes to step S50, where the user starts speaking by telephone. The CPU 61 supplies the user's voice that is captured with the microphone 15 to the base 1 via the RF transmission/reception section 65. The CPU 43 of the base 1 transmits the user's voice that is captured via the RF transmission/reception section 46 to the other person via the modem 47. Further, when receiving, via the modem 47, an audio signal that is transmitted from the other person, the CPU 43 supplies it to the terminal 3 via the RF transmission/reception section 46. In the terminal 3, the audio signal originating from the other person is received by the RF transmission/reception section 65 and output from the speaker 13.

Figure 31:

When a video signal is transmitted from the other person together with the audio signal, at step S51 an image of the other person is displayed in the window 221. FIG. 31 shows a state that an image of the other person is displayed in the window 221 in this manner.

At step S52, the CPU 61 executes a self monitor display process, whereby a self monitor in which to display the user's own image is displayed in a window 231. At step S53, the CPU 61 judges whether a self-image display button (button 232 shown in FIG. 31) in the window 231 has been turned on. The user turns on the button 232 when he wants to transmit his own image and have it displayed in the window 221 of the terminal 3 of the other person. If it is judged that the self-image display button 232 has been turned on, the process goes to step S54, where a default image that has been registered in advance in the storage device 64 is read out and displayed in the window 231 as a self-image. With this measure, for example, when the user receives an unexpected call and he does not want to transmit his current image to the other person, he can transmit an image that has been registered in advance in the storage device 64. A registered image that is displayed first may be an image corresponding to the input password.

Figure 32:
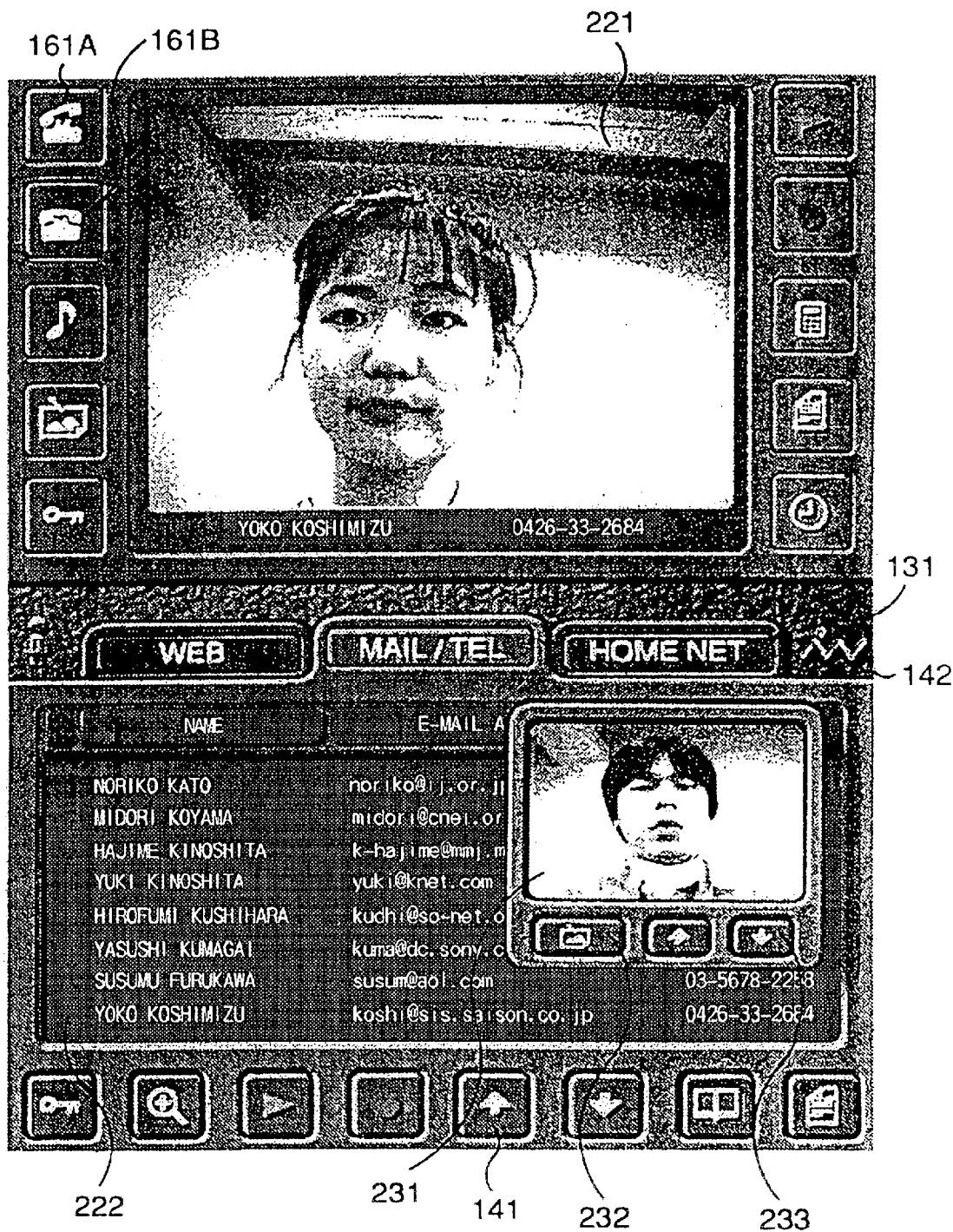

The window 231 has a button 233 to change the image to be displayed in the window 231 (i.e., the image to be transmitted to the other person). At step S55, it is judged whether the button 233 has been turned on. If it is judged that the button 233 has been turned on, the process goes to step S56, where the CPU 61 reads out another image stored in the storage device 64 or captures a current image of the user just taken by the video camera 12, and displays the image in the window 231. FIG. 32 shows a display example in this state. If it is judged at step S55 that the change button 233 has not been turned on, step S56 is skipped.

At step S57, it is judged whether a preset time has elapsed. If the preset time has not elapsed yet, the process returns to step S55 to repeat the ensuing process. If it is judged that the preset time has elapsed, the process goes to step S58, where an image currently displayed in the window 231 is transmitted to the other person. That is, the CPU 61 transmits data of the image being displayed in the window 231 to the base 1 via the RF transmission/reception section 65. Upon reception of this image data via the RF transmission/reception section 46, the CPU 43 of the base 1 transmits it to the other person via the modem 47. The user's image that is transmitted in this manner is displayed in the window 221 of the terminal 3 of the other person.

At step S59, it is judged whether a button for finishing a call (button 161B shown in FIG. 32) has been manipulated. If the button 161B has not been manipulated, the CPU 61 waits until it is manipulated. The user turns on the button 161B when he wants to finish a call. Upon manipulation of the button 161B, the process goes from step S59 to step S60, where the CPU 61 executes a process of opening the telephone circuit. Then, the process returns to step S31 to repeat the ensuing process.

If it is judged at step S53 that the self-image display button 232 has not been turned on, the process goes to step S59 skipping steps S54–S58. That is, in this case, the user's registered image is not transmitted to the other person and only a vocal communication is performed.

On the other hand, if it is judged at step S45 that there is no call arrival, the process goes to step S46, where it is judged whether the mail button (button 141B shown in FIG. 30) has been turned on. If it is judged that the mail button 141B has been turned on, the process returns to step S34, where the mail generation picture display process is executed. Then, the ensuing process is executed. As described above, pictures for making a telephone call or receiving a call (for instance, the picture of FIG. 30) has the button 141B for making a transition to a picture of generating mail, and pictures for generating mail (for instance, the picture of FIG. 29) has the button 141A for making a transition to a picture for making a telephone call or receiving a call. Therefore, a transition from one kind of picture to the other kind can be effected easily.

If it is judged at step S46 that the mail button 141B has not been turned on, a process of making a telephone call to the other person is executed at steps S61 onward.

In this case, at step S61, the user inputs the telephone number of a person to call. This may be done by selecting, with the cursor, a desired one of the preregistered telephone numbers from a correlation table shown in the window 222 of FIG. 30 or manipulating the character input device 54. If a certain telephone number is input in this manner, the process goes to step S62, where the CPU 61 executes the process of displaying a self monitor for displaying a self-image. As a result, the window 231 as exemplified in FIG. 31 is superimposed on the picture as shown in FIG. 30.

At step S63, it is judged whether a button 232 (self-image display button) in the window 231 has been turned on. If it is judged that the button 232 has not been turned on, the process goes to step S64, where it is judged whether a call button (button 161A in FIG. 30) has been turned on. If it is judged that the button 161A has not been turned on, the process returns to step S61 to repeat the ensuing process.

If it is judged at step S63 that the button 232 in the window 231 has been turned on, the process goes to step S65, where the registered picture display process is executed. That is, the CPU 61 reads out the default image that has been stored in advance in the storage device 64 and has it displayed in the window 231. Also in this case, the image corresponding to the input password is displayed in the window 231. At step S66, it is judged whether the button 233 in the window 231 has been turned on. If the button 233 has been turned on, the process goes to step S67, where the CPU 61 reads out another image that is stored in the storage device or an image captured by the video camera 12. At step S65, the CPU 61 causes the thus-obtained image to be displayed in the window 231. In this manner, when necessary, the user manipulates the change button 233 to have a desired image displayed in the window 231. If it is judged at step S66 that the change button 233 has not been turned on, the process goes to step S64, where it is judged whether a call button 161A has been turned on.

If it is judged at step S64 that the call button 161A has been turned on, the process goes to step S68, where the CPU 61 executes a process of calling the telephone number that was input at step S61. Specifically, the CPU 61 requests, via the RF transmission/reception section 65, the CPU 43 of the base 1 to perform a calling operation. When receiving this request from the CPU 61 via the RF transmission/reception section 46, the CPU 43 controls the modem 47 and makes it start an operation of calling the specified telephone number.

At step S69, it is judged whether the other person has responded. If it is judged that the other person has not responded yet, the process goes to step S73, where it is judged whether the finish button 161B has been turned on. If it is judged that the finish button 161B has not been turned on, the process returns to step S68 to continue the process of calling the other person. If it is judged at step S73 that the finish button 141B has been turned on, the process goes to step S74, where the calling operation is stopped. Then, the process returns to step S45 to repeat the ensuing process.

If it is judged at step S69 that the other person has responded, the process goes to step S70, where a circuit closing process is executed. A conversation by telephone is started at step S71. At step S72, it is judged whether an image is displayed in the self monitor (i.e., whether the button 232 is turned on). When the user wants to transmit his image to the other person, he manipulates the button 232 so that the image preregistered in the storage device 64 or his own image currently captured by the video camera 12 is displayed in the window 231. If an image is displayed in the window 231 (i.e., if the self-image display button 232 is turned on), the process goes to step S58, where a process of transmitting the same image as displayed in the window 231 to the other person is executed.

If it is judged at step S72 that the button 232 has not been turned on, step S58 is skipped. Then, the process goes to step S59, where the CPU 61 waits until the finish button 161B is turned on. If the finish button 161B has been turned on, the process goes to step S60, where the circuit opening process is executed. Then, the process returns to step S45.

It goes without saying that a user can make a telephone call in an ordinary manner by using the telephone 2.

Figure 33:
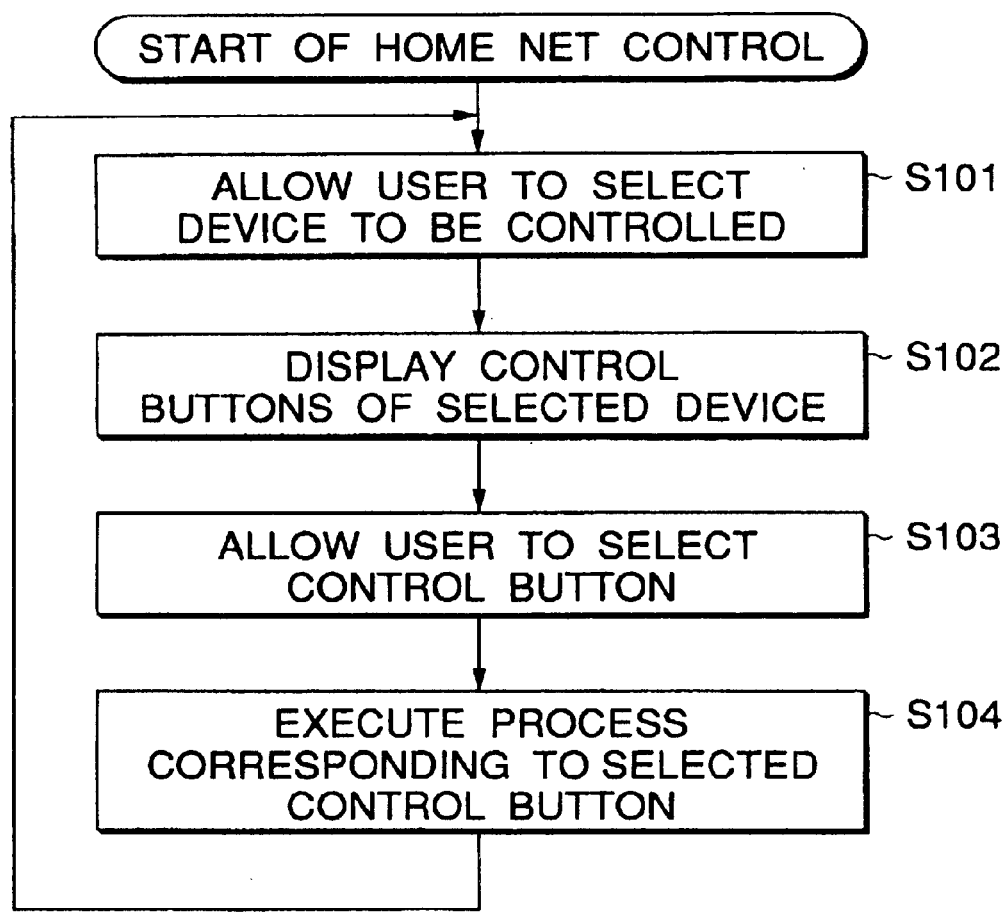
FIG. 33 is a flowchart showing a detailed operation of home net control in the terminal 3.
Figure 34:
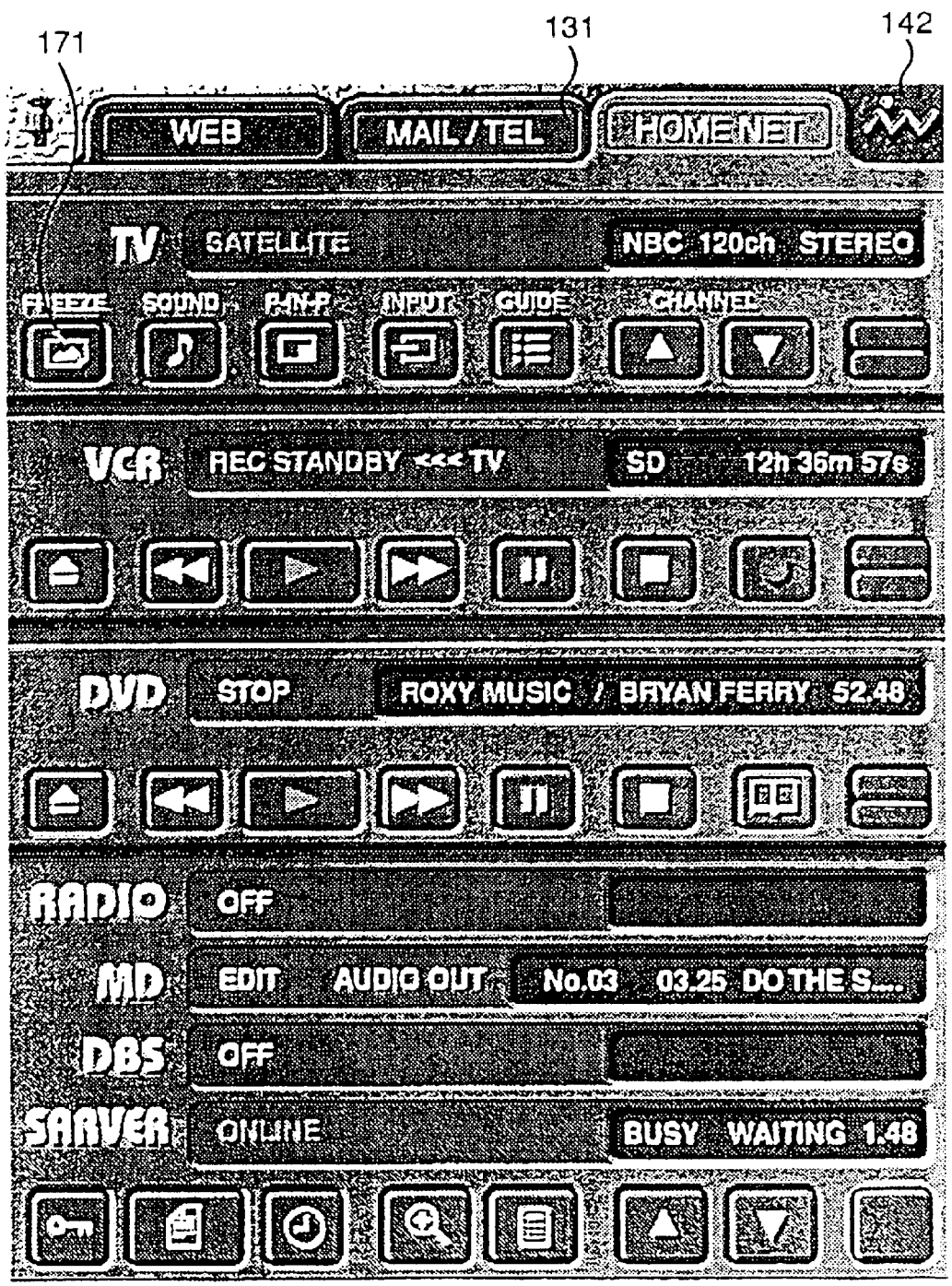
FIGS. 34 and 35 are photographs showing display examples on the LCD of the terminal 3.

Next, with reference to a flowchart of FIG. 33, a detailed description will be made of the home net control that is performed in a state that the HOME NET picture as shown in FIG. 22 is displayed. To control a desired device, at S101 a user performs a manipulation of selecting the device to be controlled. For example, the user selects, by moving the cursor, an AV device to be controlled from among AV devices that are connected to each other via the IEEE 1394 bus 52. If a desired device is selected, the process goes to step S102, where the CPU 61 executes a process of displaying control buttons for controlling the selected AV device. FIG. 34 shows an example of control buttons 171 displayed on the LCD 11. In this example, a television receiver (TV), a video cassette recorder (VCR), and a digital video disc (DVD) are selected as AV devices to be controlled and control buttons 171 are displayed.

At step S103, the user selects a desired button from among the buttons 171 that are displayed on an AV device basis as shown in FIG. 34 and makes a control instruction. If one of the buttons 171 of the AV devices is manipulated, a process corresponding to the manipulated control button 171 is executed at step S104.

Figure 35:
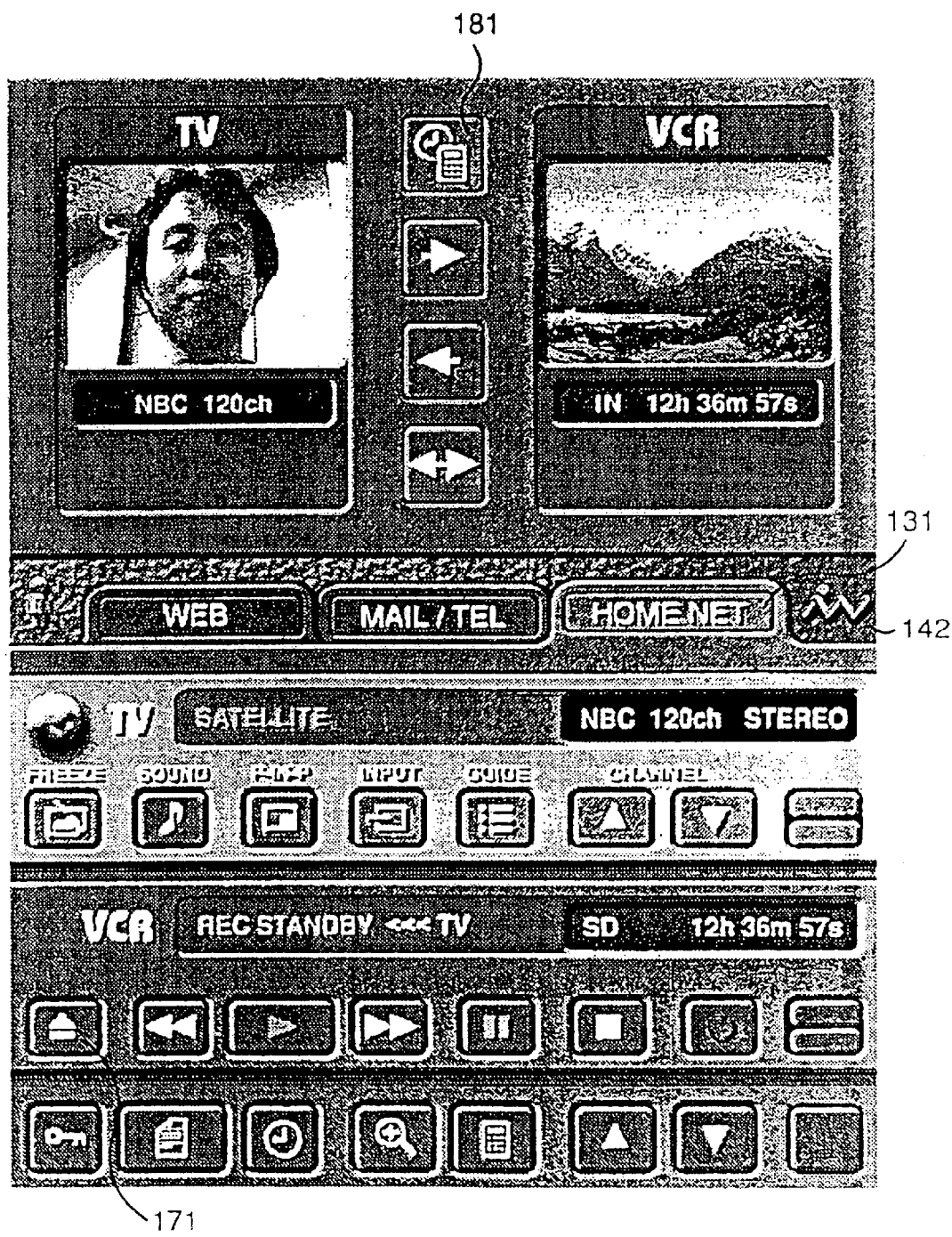

At this time, the CPU 61 transmits a command corresponding to the manipulated control button 171 to, for instance, the AV controller 53 directly or via the base 1. When capturing the command that is supplied by radio or via the IEEE 1394 bus 52, the AV controller 53 controls the AV device in accordance with the command. FIG. 35 shows an example of a picture that is displayed in a case of receiving an image of the 120th channel with the television receiver and recording it with the video cassette recorder.

Figure 19:
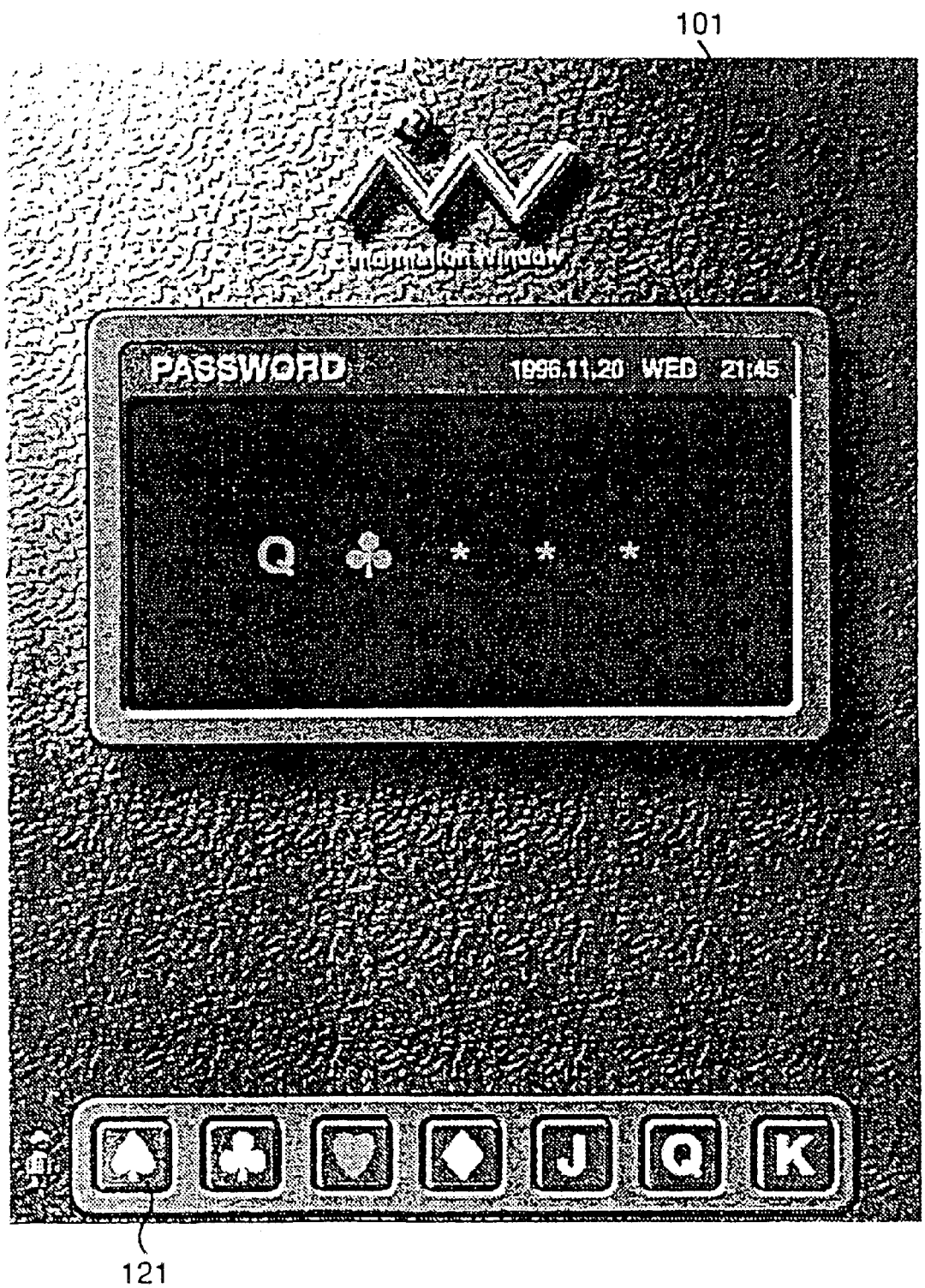
Figure 36:
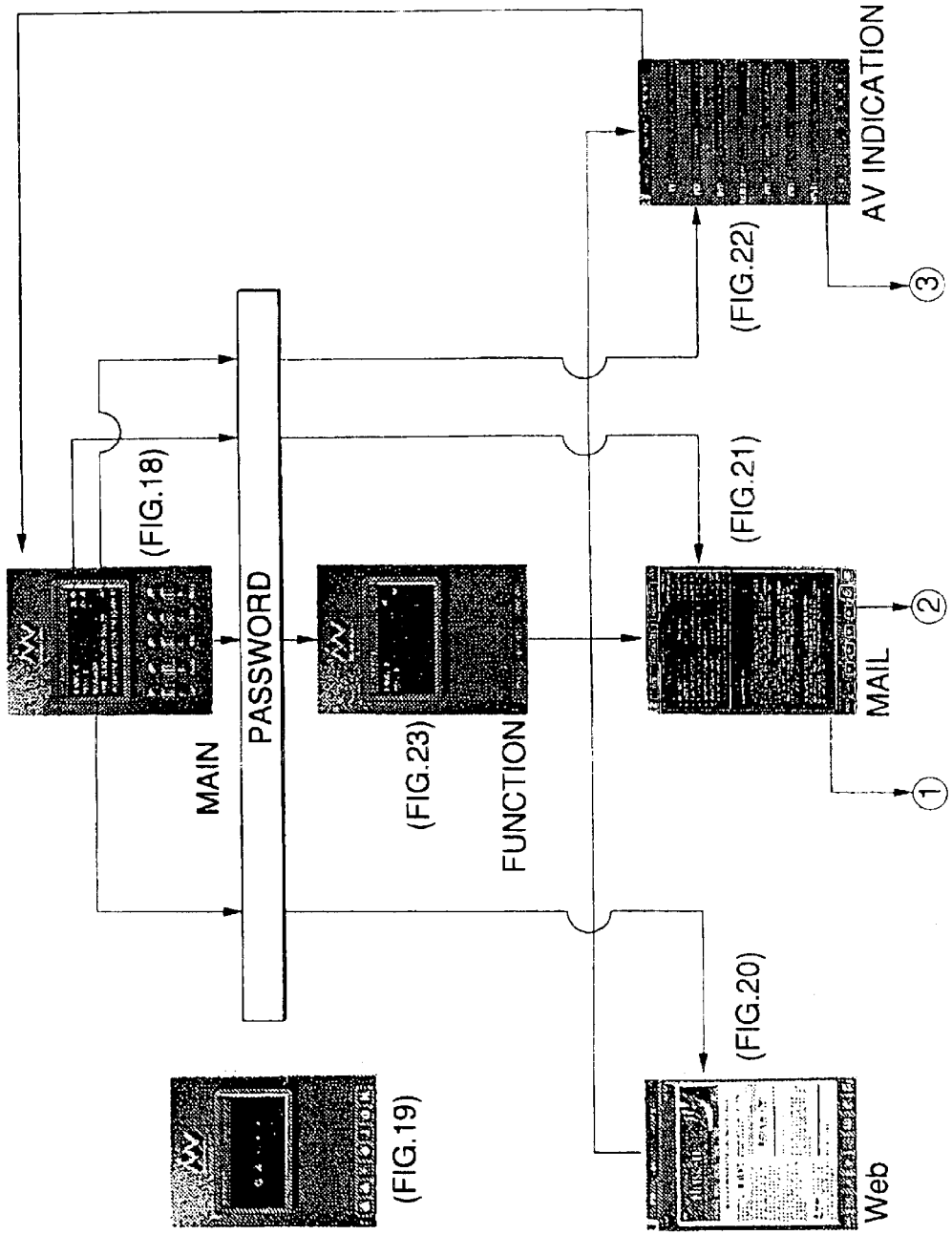
FIGS. 36 and 37 show how transitions occur between displayed pictures in the terminal 3.
Figure 37:
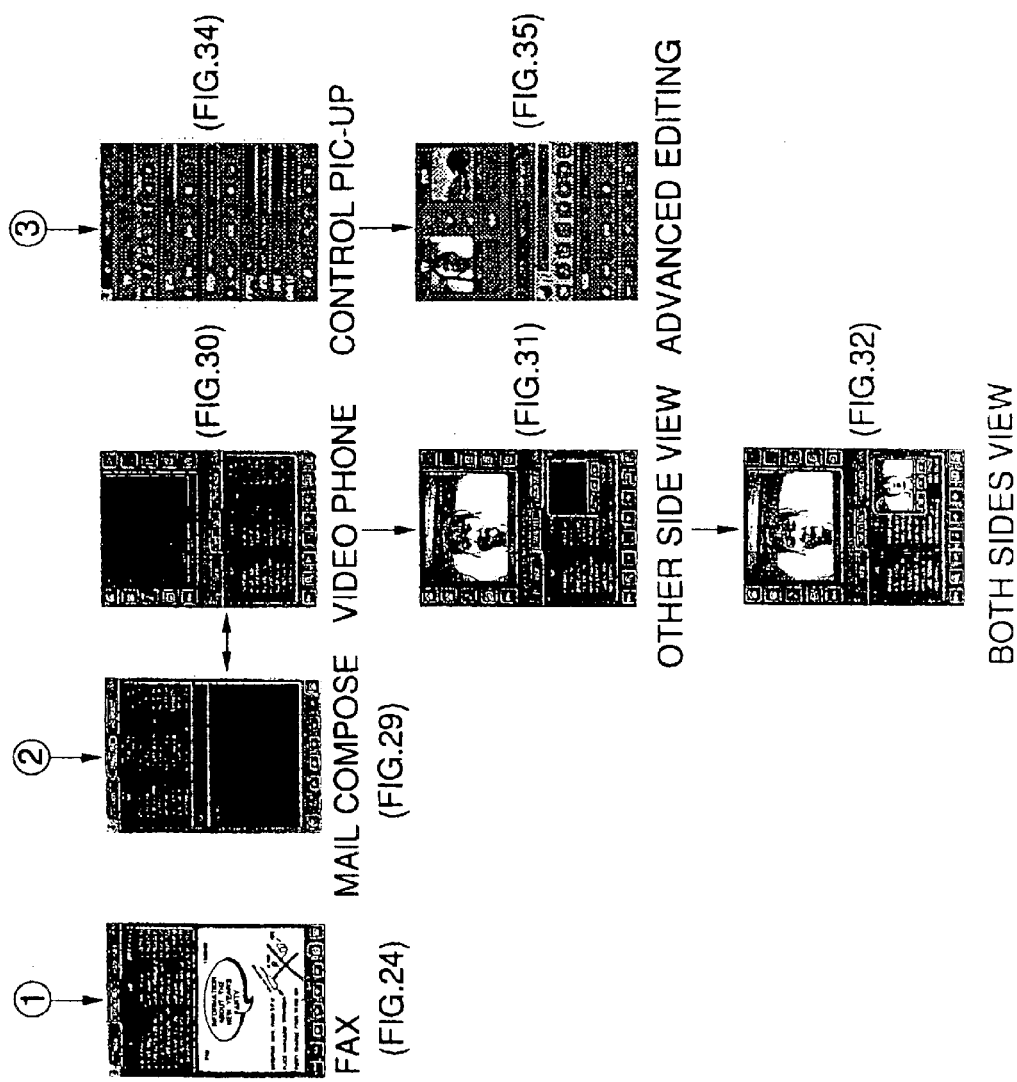

FIGS. 36 and 37 show how transitions occur between displayed pictures shown in FIGS. 18–24, 29–32, and 34–35. As shown in these figures, when a certain input is made in the menu picture of FIG. 18, the password input picture of FIG. 19 is displayed. If the WEB key is selected and a password is input, the WEB picture of FIG. 20 is displayed. If a password is input in a state that the E-Mail key is selected, the MAIL/TEL picture of FIG. 21 is displayed. If a password is input in a state that the VTR key is selected, the HOME NET picture of FIG. 22 is displayed.

If a password is input in a state that a symbol is selected, the function picture of FIG. 23 is displayed. If the tab MAIL/TEL is selected in the function picture of FIG. 23, the picture of FIG. 21 is displayed.

In each of the three modes of WEB, MAIL/TEL, and HOME NET shown in FIGS. 20–22, a transition to another, desired mode can be made by selecting the corresponding tab that is displayed in each picture. Further, in each of these three modes, the process can return to the menu picture of FIG. 18 when the home return key (button 142) is selected.

If another received mail is selected in the MAIL/TEL picture of FIG. 21, the contents of the newly selected mail are displayed as shown in FIG. 24.

If the mail button 141B is selected in the MAIL/TEL picture of FIG. 21, the mail generation picture is displayed as shown in FIG. 29. If the telephone button is selected in the mail generation picture of FIG. 29, a transition to the video phone picture of FIG. 30 occurs. If the mail button 141B is selected in the video phone picture of FIG. 30, the mail generation picture of FIG. 29 is restored.

If a call arrives in a state that the video phone picture of FIG. 30 is displayed, an image of the other person is displayed in the window 221 of FIG. 31 and the window 231 is displayed. If the button 232 in the window 231 is turned on, a self-image is displayed in the window 231 as shown in FIG. 32 and is transmitted to the other person.

If a desired AV device is selected in the HOME NET picture of FIG. 22, buttons for controlling the selected AV device are displayed as shown in FIG. 34. If a desired control button is manipulated in the display state of FIG. 34, the control and display corresponding to the manipulated button are performed as shown in FIG. 35.

The terminal 3 is portable; it can easily be removed from the base 1 and carried. Therefore, as shown in FIG. 38, usually the base 1 is located in room A and the telephone 2 and the terminal 3 are mounted on the base 1. When a telephone call arrives, a conversation can be performed in an ordinary manner by using the telephone 2 if it is not necessary to watch an image of the other person. Naturally, if a user wants to make a conversation by telephone while watching an image of the other person, he may do it in room A by using the terminal 3 in the state that the terminal 3 is mounted on the base 1. Further, the user can control other AV devices in room A by radio by using the terminal 3.

If E-mail or a facsimile message arrives from a third person in the above state, the CPU 43 captures its data via the modem 47 and transmits it to the terminal 3 via the RF transmission/reception section 46. The CPU 61 of the terminal 3 captures the data via the RF transmission/reception section 65 and stores it in the storage device 64. In this manner, a received facsimile message or E-mail is automatically stored in the storage device 64.

When E-mail or a telephone call arrives, a person who sent the E-mail or made the telephone call is identified and an identification result is displayed in the menu picture of the terminal 3 as shown in FIG. 18. By viewing the menu picture, a user can recognize whether E-mail etc. directed to him has arrived by checking whether the colors of respective marks 102 coincide with the color of the symbol 103 that is assigned to him. If necessary, a user can carry the terminal 3 to his room B, where he can read out E-mail that is directed to him and read its contents (see FIG. 38).

Although in the above embodiment data exchange between the base 1, the telephone 2, and the terminal 3 is performed by using a radio signal, it may be performed by using infrared light. The essential point is the wireless communication.

As described above, since E-mail or a facsimile message is automatically received in the terminal 3 and stored in the storage device 64, it is not necessary to display received information on a television receiver or the like. For example, even where the television receiver is not turned on, such information can automatically be received and stored. Therefore, each family member can immediately recognize arrival of even urgent information. Since E-mail or a facsimile message can be displayed on the terminal 3 itself to allow its recognition, there does not occur an event that arrival of such information prevents other family members from fully enjoying television programs, unlike the case of displaying such information on the television. Further, since the terminal is portable, a user can carry it to his room and check it there. Therefore, even if the terminal 3 is shared by a plurality of family members, their privacy can be secured.

What is claimed is:

1. An information processing apparatus comprising:
   a registration means for registering a user to have access to information via said information processing apparatus, a password to restrict access to information related to the user, and for associating the user to a symbol so as to identify the user from other registered users;
   a receiving means for receiving the information via a communication network;
   an associating means for associating said received information to said user;
   storing means for storing said received information;
   a first display means for displaying said symbol and a plurality of function identification means each for identifying a function accessible by said user according to an association between said function and said symbol;

a first selection means for selecting said symbol corresponding to said user displayed by said first display means;

an authorization means for authorizing access of said information responsive to an entered password matching the user's registered password;

a second selection means for selecting one of said function identification means and enabling access to a corresponding information upon authorization by said authorization means; and a second display means for displaying said corresponding information upon selection by said second selection means, wherein said function comprises a function to access at least one of a web page selected for access by said user, and an identification of another apparatus that can be controlled by said user through a signal transmitted by said information processing apparatus.

2. The information processing apparatus according to claim 1, wherein said symbol and a plurality of other symbols for different users each have different colors.

3. The information processing apparatus according to claim 1, further comprising:

discriminating means for indicating that said received information is stored in the storing means.

4. An information processing method comprising:

a registering step of registering a user to have access to information via an information processing apparatus, a password to restrict access to information related to said user, and associating said user to a symbol so as to identify said user from other registered users;

a receiving step of receiving information received via a communication network;

an associating step of associating said received information to said user;

a storing step of storing said received information;

a first displaying step of displaying said symbol and a plurality of function identification means for identifying a function accessible by said user according to an association between said function and said symbol;

a first selecting step of selecting said symbol corresponding to said user displayed in said first displaying step;

an authorization step of authorizing access of said information if an entered password matches said registered password;

a second selecting step of selecting one of said function identification means and enabling access to a corresponding information upon authorization in said authorization step; and a second displaying step of displaying said corresponding information upon selection in said second selecting step;

wherein said function comprises a function to access at least one of, a web page selected for access by said user and an identification of another apparatus that can be controlled by said user through a signal transmitted by said information processing apparatus.

5. An information processing apparatus comprising:

a memory configured to store an information that is received via a communication network with a wireless receiver, wherein the information is associated with a corresponding one of a plurality of users of said information processing apparatus, the user being registered to have access to the information via said information processing apparatus, the information processing apparatus having a password to restrict access to information related to the user and associating the user to a symbol so as to identify the user from other registered users;

a touch panel configured to accept selection of the symbol displayed on a display device being removable from said wireless receiver, to accept selection of the password by touching buttons displayed in a screen on said display device, and to accept selection of one of a plurality of function identification means with a touching means and access a corresponding information upon authorization of an accepted password matching the registered password, the function identification means for identifying a function accessible by said user according to association between said function and said symbol; and a processor configured to display the corresponding information upon selection with the touching means, wherein said function comprises a function to access at least one of, a web page selected for access by said user and an identification of another apparatus that can be controlled by said user through a signal transmitted by said information processing apparatus.

6. An information processing apparatus comprising:

storing means for storing an information that is received via a communication network with a wireless receiver, wherein the information is associated with a corresponding one of a plurality of users of said information processing apparatus, the user being registered to have access to the information via said information processing apparatus, the information processing apparatus having a password to restrict access to information related to the user and associating the user to a symbol so as to identify the user from other registered users;

selection means for selecting the symbol displayed on a display device being removable from said wireless receiver, for selecting the password by touching buttons displayed in a screen on said display device, and for selecting one of a plurality of function identification means with a touching means and access a corresponding information upon authorization of an accepted password matching the registered password, the function identification means for identifying a function accessible by said user according to association between said function and said symbol; and output means for display the corresponding information upon selection with the touching means, wherein said function comprises a function to access at least one of, a web page selected for access by said user and an identification of another apparatus that can be controlled by said user through a signal transmitted by said information processing apparatus.

* * * * *